(12) United States Patent
Roberts et al.

(10) Patent No.: US 8,880,903 B2
(45) Date of Patent: *Nov. 4, 2014

(54) REMOVABLE DRIVE WITH DATA ENCRYPTION

(71) Applicant: Strong Bear LLC, Palisade, CO (US)

(72) Inventors: Rodney B. Roberts, Palisade, CO (US); Ronald B. Gardner, Keota, OK (US)

(73) Assignee: Strong Bear LLC, Palisade, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,926

(22) Filed: Aug. 13, 2013

(65) Prior Publication Data

US 2013/0332747 A1    Dec. 12, 2013

Related U.S. Application Data

(63) Continuation-in-part of application No. 13/098,679, filed on May 2, 2011, now Pat. No. 8,527,780, which is a continuation of application No. 11/415,563, filed on May 2, 2006, now Pat. No. 7,945,788.

(60) Provisional application No. 60/677,234, filed on May 3, 2005.

(51) Int. Cl.
| | |
|---|---|
| G06F 21/00 | (2013.01) |
| G06F 21/60 | (2013.01) |
| G06F 21/79 | (2013.01) |
| G06Q 50/24 | (2012.01) |

(52) U.S. Cl.
CPC ............ *G06F 21/602* (2013.01); *G06F 21/79* (2013.01); *G06Q 50/24* (2013.01); *G06F 2221/2107* (2013.01)
USPC .......... 713/192; 713/161; 713/168; 713/182; 713/193; 705/3; 705/59

(58) Field of Classification Search
USPC ........................................................ 713/192
See application file for complete search history.

(56) References Cited

U.S. PATENT DOCUMENTS

| | | | |
|---|---|---|---|
| 7,010,808 B1 | 3/2006 | Leung et al. | |
| 7,073,063 B2 | 7/2006 | Peinado | |
| 7,076,062 B1 | 7/2006 | Spies | |
| 7,085,932 B1 * | 8/2006 | Morgan, III | ................... 713/182 |
| 7,194,618 B1 | 3/2007 | Suominen | |
| 2003/0191716 A1 | 10/2003 | Woods et al. | |
| 2004/0083378 A1 * | 4/2004 | LeRose | ......................... 713/193 |
| 2004/0250087 A1 | 12/2004 | Ray et al. | |
| 2005/0177694 A1 | 8/2005 | Peinado | |
| 2005/0177754 A1 | 8/2005 | Pezeshk | |
| 2005/0259458 A1 | 11/2005 | Rustagi et al. | |
| 2006/0184806 A1 | 8/2006 | Luttmann et al. | |
| 2006/0208066 A1 | 9/2006 | Finn et al. | |

* cited by examiner

*Primary Examiner* — Jason Lee
(74) *Attorney, Agent, or Firm* — March Fischmann & Breyfogle LLP; Kent A. Lembke

(57) ABSTRACT

A removable drive such as a USB drive or key is provided for connecting to computer devices to provide secure and portable data storage. The drive includes a drive manager adapted to be run by an operating system of the computer device. The drive manager receives a password, generates a random key based on the password, encrypts a user-selected data file in memory of the computer device using the key, and stores the encrypted file in the memory of the removable drive. The drive manager performs the encryption of the data file without corresponding encryption applications being previously loaded on the computer system. The drive manager may include an Advanced Encryption Standard (AES) cryptography algorithm. The drive manager generates a user interface that allows a user to enter passwords, select files for encryption and decryption, and create folders for storing the encrypted files on the removable drive.

20 Claims, 19 Drawing Sheets

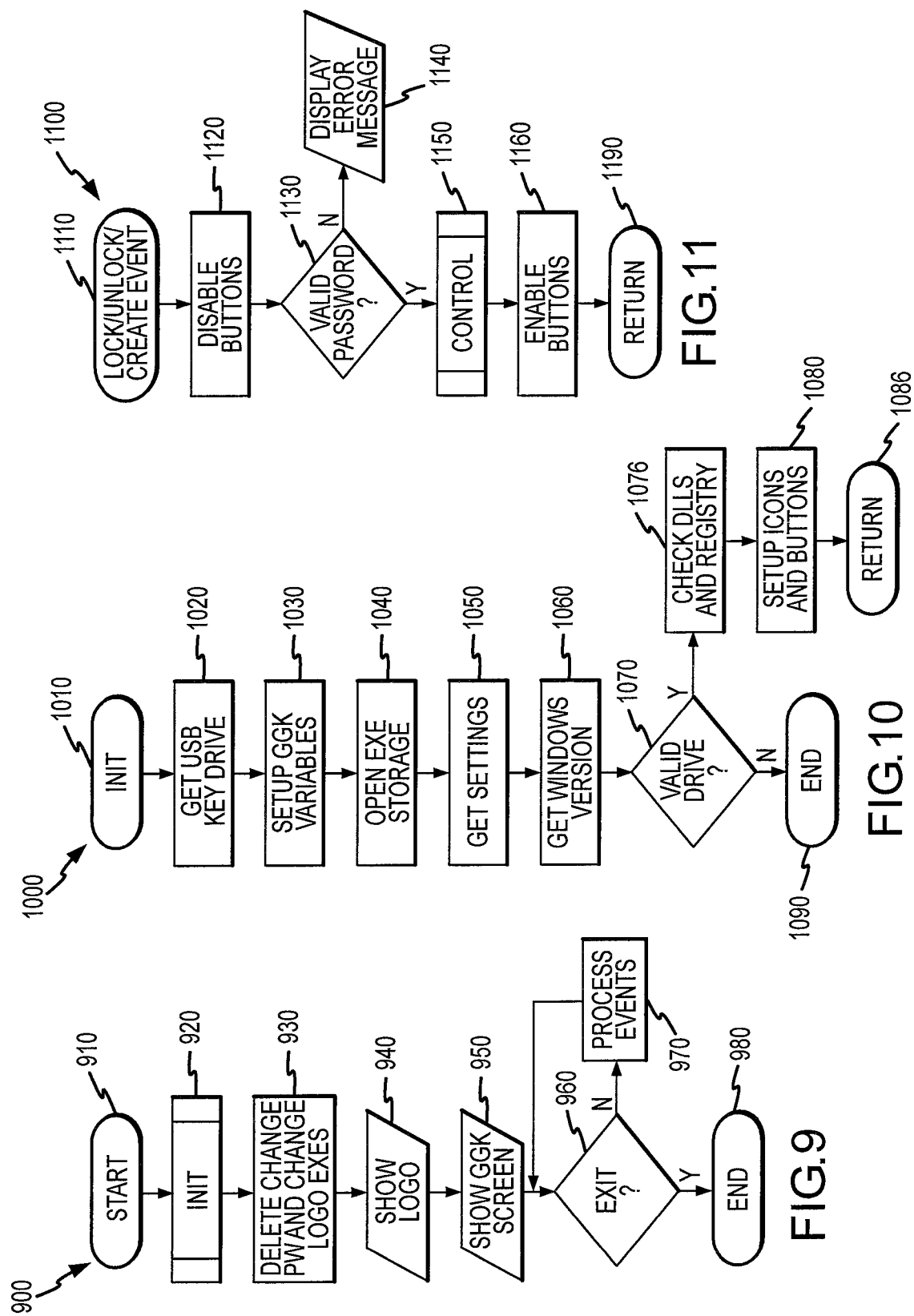

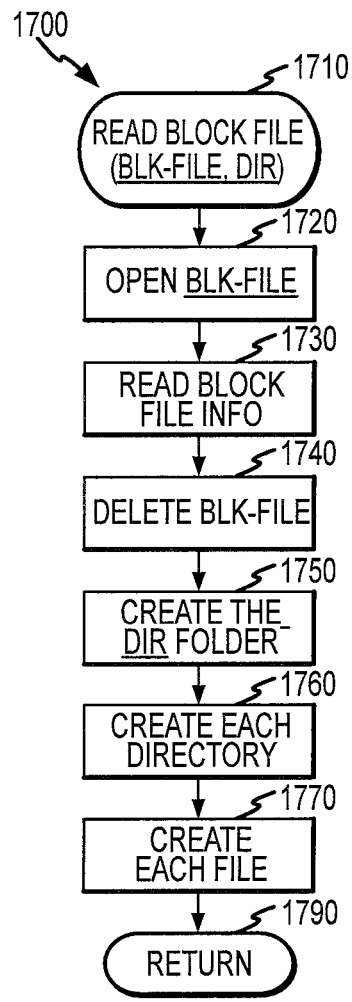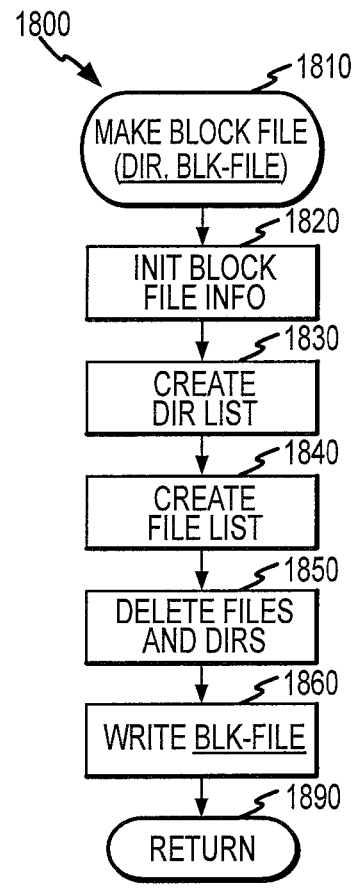
FIG.17
FIG.18

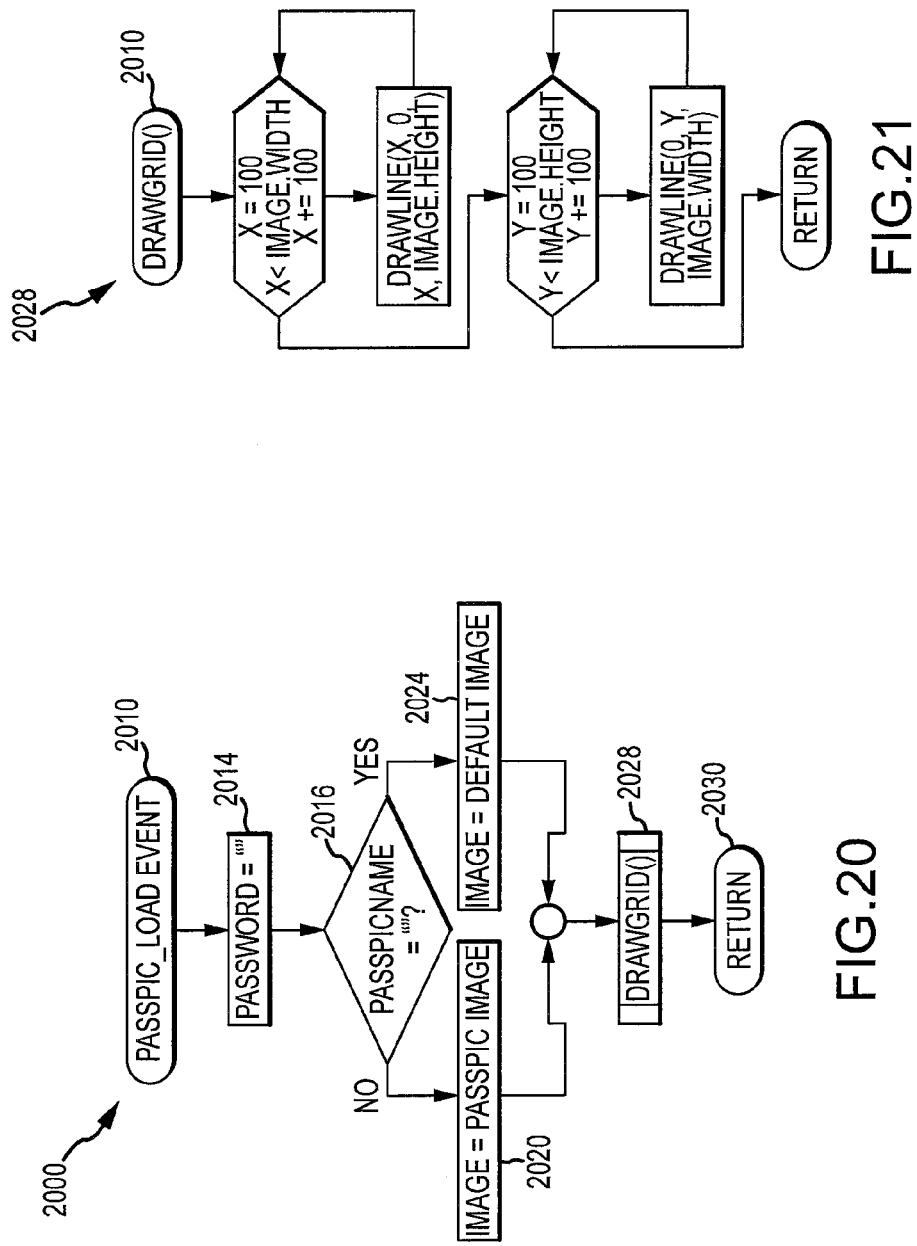

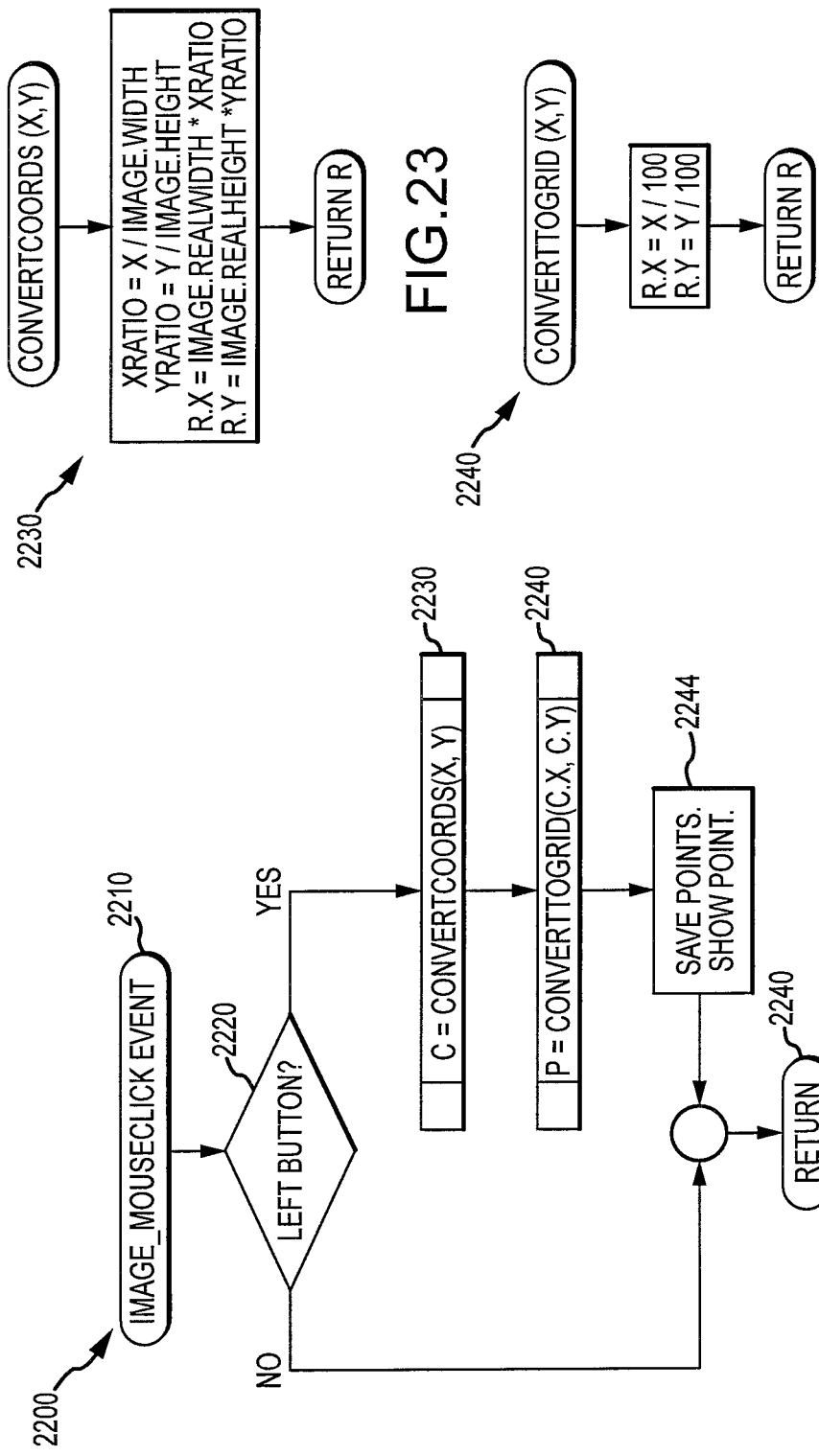

REMOVABLE DRIVE WITH DATA ENCRYPTION

CROSS-REFERENCE TO RELATED APPLICATIONS

This application is a continuation-in-part (CIP) of U.S. patent application Ser. No. 13/098,679, filed May 2, 2011, which is a continuation of U.S. patent application Ser. No. 11/415,563, filed May 2, 2006, entitled, "Removable Drive with Data Encryption," now U.S. Pat. No. 7,945,788, which claimed the benefit of U.S. Provisional Application No. 60/677,234 filed May 3, 2005, both of which are incorporated herein by reference in their entireties.

BACKGROUND OF THE INVENTION

1. Field of the Invention

The present invention relates, in general, to providing secure data storage on drives and/or memory devices that are adapted for connection and removal from desktops, workstations, laptops, and other computing devices, and, more particularly, to software and removable drives (or memory devices) with such software that is adapted for managing encryption and file and directory processes.

2. Relevant Background

Recently, there has been an explosive increase in the use of small, removable drives or memory devices for transporting data from one computer to another, e.g., an employee can save their work files quickly on the removable drive, take the drive home, and then plug the removable drive into their home or laptop computer to access their work. A growing concern, however, is how to keep this portable data secure. For example, if the removable drive is lost, there is a need for preventing the data to be accessible.

In the mid-1990s, it was becoming clear that the serial and parallel ports on personal computers were outliving their usefulness, but there remained a need for high speed data transfer to portable storage media or devices. A new serial bus was designed to replace the old serial and parallel ports, and in 1996, the Universal Serial Bus (USB) 1.0 was created. The new serial bus protocol supported two signaling rates: low speed (1.5 Mbps) and high speed (12 Mbps). Unfortunately, there was practically no operating system support for USB 1.0 and limited hardware available for use with the new USB 1.0 port. However, more recently, operating systems, such as Windows 98 and later versions provided by Microsoft Corporation, have been widely distributed and provide support for USB. As a result, increasing numbers of USB devices have hit the market that are able to store large amounts of data, and USB 2.0 was created with speeds up to 480 Mbps.

USB devices are typically used as removable memory devices with their use simply requiring a user to plug the USB device into the USB port of a computer and within seconds a new drive or removable disk appears on the desktop. In the following discussion, the term "removable drives" is used to cover all removable USB devices, which have numerous labels such as USB keys, USB flash drives, pen drives, jump drives, thumb drives, key drives, memory sticks, mobile memories, removable USB disks, and other terms. These removable drives have become so popular in part because they do not need batteries, provide solid state data storage with long data retention, offer good data transfer speeds, and are durable and portable. Removable drives are one of the best ways to store and transport data as they hold more data than floppy disks and ZIP disks while not being susceptible to data loss risks associated with magnetic media. Removable drives are becoming less expensive with higher capacities. As a result, the market for USB-powered devices is growing exponentially as more businesses and consumers seek greater data portability and reliability.

However, the use of removable drives may be limited by security concerns. Specifically, many consumers are concerned about carrying large amounts of often sensitive or private information around in a small key or stick that while providing many advantages for data portability is also more susceptible to loss or theft. Many consumers are demanding that processes be provided for securing the data that is stored on removable drives such that the data stored on the drives cannot be accessed without their permission.

Existing attempts to provide security for removable drives has not been widely accepted or effective. Some have attempted to address the security issue by installing an encryption program on the removable drive and a corresponding encryption/security program on each computer or computing device in which the removable drive will be inserted on the USB port (e.g., for which the USB key will be interfaced). The program resident on the computer is typically required due to the high complexity of the utilized encryption program. This has not proven to be a satisfactory solution as it requires that an additional preliminary program be installed on each and every computer for which a user may wish to use their key or removable drive. The presence of additional data and/or the additional program on the user's computers leaves a telltale "footprint" on every hard drive, and this may compromise the security of these computers. As a result, these computers are more vulnerable to other users and hackers.

To support the further use of USB keys or "removable drives," there remains a need for improved techniques for providing secure data storage. Preferably, such security methods would limit or eliminate any footprints that interface with the removable drives and would also be useful for existing and future USB ports and devices with minimal modifications. Also, such security methods should be relatively easy to use and not unnecessarily effect data access speeds.

SUMMARY OF THE INVENTION

The present invention addresses the above problems by providing a method and corresponding removable drives (e.g., USB flash drives, USB keys, and the like) that provide enhanced security for data stored on these drives. Briefly, a removable drive manager application or program (e.g., a data security program) is provided that is designed to be used with a removable drive such as a USB key to provide security for data files. An encryption module is provided as part of the drive manager, and in some embodiments, the encryption module utilizes a cryptography algorithm, such as one based on the Advanced Encryption Standard (AES) (i.e., an AES algorithm), to encrypt and decrypt files stored on the removable drive. The removable drive does not require a portion of the encryption module to be installed on a computer before the removable drive can interface with the computer via its USB port. The drive manager application generates a user interface on the interfaced computer's monitor that allows a user to select files for data protection (e.g., such as by selecting files from their desktop and/or dragging files to folders) and to instruct the drive manager to "lock" the selected files such by encryption. To access or initiate the drive manager, the user is requested to enter a password, which is used by the encryption module to randomly generate a key for encrypting and decrypting private or secure files.

More particularly, a removable drive or device (such as a USB drive, key, stick, or the like) is provided for connecting to computer devices to support secure storage of and access to data on the removable drive. The drive includes a connector for communicatively connecting with a port (e.g., a USB port) of a computer device. Memory, e.g., solid state, is provided in the drive. The drive includes a removable drive manager that is adapted to be run by an operating system on the computer device (e.g., the operating system may include a separate or integral USB driver). The drive manager functions to receive a password, to generate a key based on the password, to encrypt a data file in memory of the computer device using the key, and to store the encrypted file in the memory of the removable drive. The drive manager may be operable to perform the encryption of the data file without corresponding encryption applications being loaded on the computer system prior to the drive being connected to the port of the computer device. The removable drive manager typically is made up of or is a class/implementation of a cryptograph algorithm such as an Advanced Encryption Standard (AES) algorithm. The drive manager is operable by the operating system to generate a user interface that allows a user to enter the password, to select files for encryption and decryption, and to create folders for storing the encrypted files on the removable drive. In some embodiments, the files selected for encryption are first combined into a single file and then encrypted, but in other cases, each selected file may be encrypted or decrypted individually (with the same password being associated with all files or with sets of the files and additional passwords being associated with other ones of the files).

BRIEF DESCRIPTION OF THE DRAWINGS

FIGS. 9-11 illustrate exemplary user interface processes provided by a removable drive manager of the invention;

FIGS. 17 and 18 are flow diagrams of file block reading and creating, respectively, as may be performed by file generator/manager module or subroutine(s) of a removable drive manager of the invention, such as shown in the devices of FIG. 1;

FIGS. 20-25 are flow diagrams showing processes implemented by a removable drive manager to allow users to use pictures or digital image files for passwords.

DETAILED DESCRIPTION OF THE PREFERRED EMBODIMENTS

Figure 1:
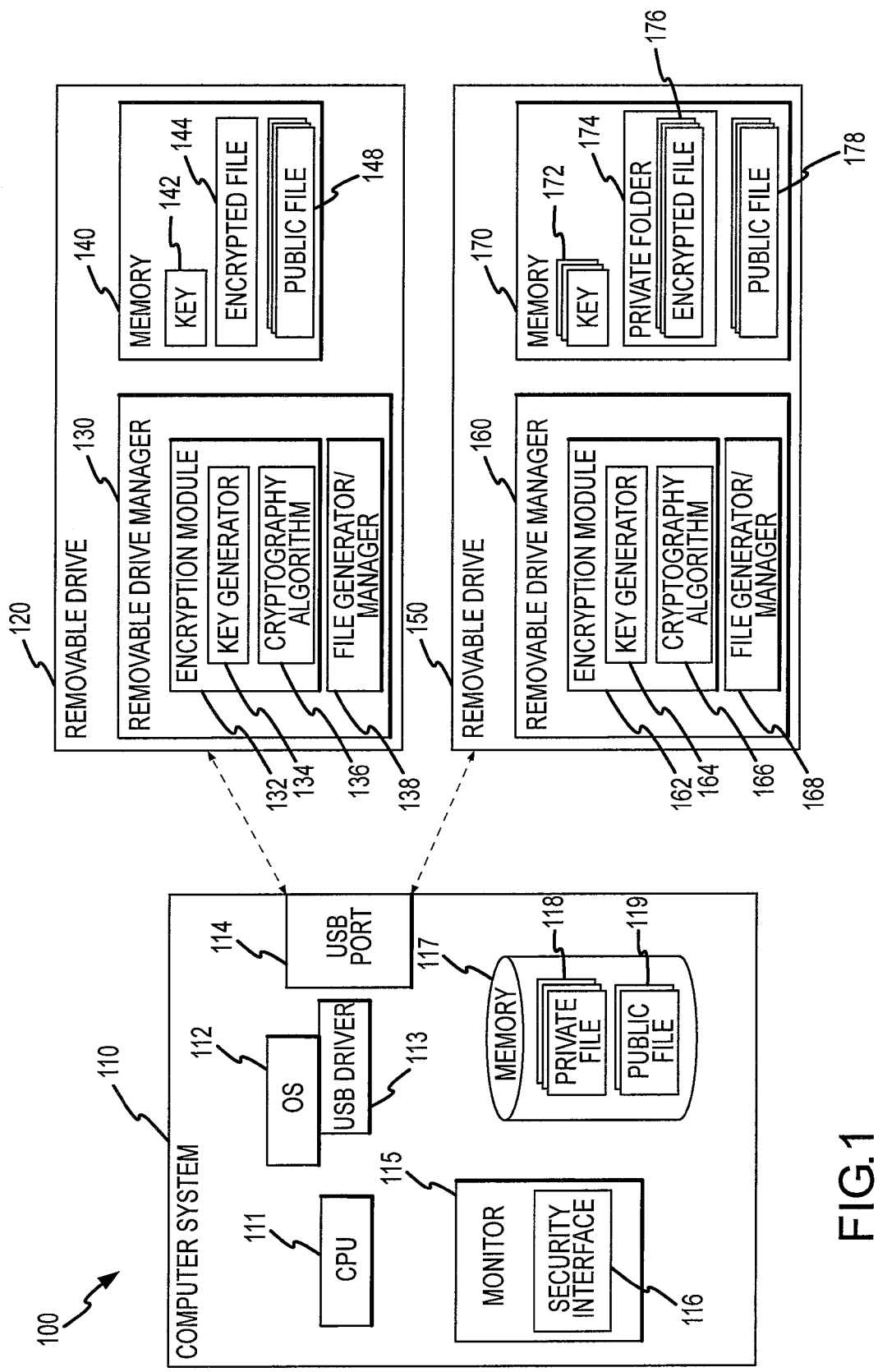
FIG. 1 illustrates two embodiments of removable drives (e.g., USB keys, flash drives, or the like) useful for providing the data security features of the present invention.

The present invention is directed to methods for providing data storage security with removable drives (which are intended to include any drive or memory device that is plugged into or connected to a USB or other port of a computer or computing device). The invention is also directed to a software program that is described as a removable drive manager in the following description and figures that may be installed on such removable drives and also to removable drives with the removable drive manager software or program. The removable drive manager is typically a standalone software program that is designed to be utilized with any USB device, e.g., a USB key, USB flash drive, USB memory, or the like and even with devices such as MP3 players, all of which herein are typically called simply "removable drives." The removable drive manager provides users with mobile security for the data they store on a removable drive. In one preferred embodiment, the removable drive manager uses the AES algorithm for its encryption processes but, of course, other cryptography algorithms may be utilized.

In use, a user simply inserts a removable drive with the removable driver manager into any computer or other electronic device with a USB or similar port and that has an operating system (such as Microsoft's Windows 98SE or higher version) that supports USB. An icon is provided on a desktop or screen of a monitor on the computer, which is selected (e.g., double clicked). The driver manager responds by generating a user interface (e.g., a "security interface"). The user is prompted to enter a password or other secure identifier, which typically is at least a predefined length, e.g., 8 digits or more. Once verified as correct (e.g., corresponds with a stored key on the removable drive), the user is ready to use the removable drive manager to decrypt previously stored files or to secure files such as by selecting (e.g., dragging and dropping) specified files onto the screen or onto a separate folder management screen or interface (or folder icons in such a screen). The user can then instruct the drive manager to secure the selected files (such as by selecting a "Lock" button in the security interface or the like). The drive manager uses the user's key and an encryption module (e.g., an AES or similar cryptography algorithm) to encrypt the selected files (e.g., individually or as a group or megafile as explained below). Significantly, the encryption module is run from the removable drive and when the removable drive is removed or unplugged from the USB port of the computer there is no footprint left behind on the computer's hard drive. The user may then remove the removable drive and proceed to any other computer with a USB port, and at this computer, the removable drive manager can again be initiated or selected with its icon, a password entered, and all or some of the secure files can be decrypted for use and/or additional files can be selected for secure storage on the removable drive.

To practice the invention, the computer, computing, and electronic devices and removable drives may be any devices useful for providing the described functions. For example, the removable drives may be nearly any device that has memory and can be inserted into a port of a computer, computing, or electronic device with one preferred embodiment having the port be a USB port and the device a USB removable drive (which falls under many labels such as USB key, USB flash drive, USB memory stick, and many more). The computer, computing, and electronic devices may be simply referred to as computer systems and generally include any devices with an operating system (OS) that supports the port and communication protocol of the removable device (e.g., an OS that supports USB such as with a USB driver or the like) and typically will have processing, memory (although this may be provided mainly with the removable drive), and input/output such as I/O ports. Data typically is transferred, saved, and communicated in digital format following standard communication and transfer protocols (such as USB protocols or the like).

FIG. 1 illustrates a secure data storage system 100 in block form that includes a computer system 110 to which one or more removable drives 120, 150 configured according to embodiments of the invention may be interfaced to allow a user of the computer system 110 to securely access and store their data. The computer system 110 may be any typical workstation, desktop, or mobile computing device. The system 110 is shown to include a processor 111 and an operating system (OS) 112. The OS 112 is shown to have a separate USB driver 113 for supporting a USB port 114, but in some cases, the support for the USB port 114 may be provided more integrally by the OS 112. The USB port 114 provides an interface, e.g., a pluggable communication interface, for receiving removable dries 120, 150. The USB port 114 may in some embodiment support USB 2.0 or later versions, but those skilled in the arts will readily understand that the features of the invention are useful with other communication ports and these existing or to be developed ports are considered within the breadth of this description.

The computer system 110 is typically configured for a user to operate the computer system 110 to access, view, enter, and store their data. In this regard, the computer system 110 further includes a monitor 115 and memory 117 (RAM, ROM, or the like). During operation of the computer system 110, a user may create or use data that is considered private (e.g., that the user wants to provide security such as encryption) and this data is shown as private files 118 (although, it should be understood that the invention allows any file to be designated as private while it is being stored to the removable drives 120, 150 and no pre-defining of the files is required). The user may also create or use data that is not private or for which security is not a concern, and this data may be stored in "public" files 119 (again, no predefining of files/data is required according to the invention). The computer system 110 may have I/O devices (not shown) such as keyboards, a mouse, and the like for providing inputting data (such as entering data for files 118, 119, for interacting with the removable drive manager 130, 160 of the drives 120, 150, interacting with interface 116, or the like). Further, the system 110 includes a monitor 115 that allows a user to view information in the files 118, 119, and more significant to the present invention, to interact with a security interface 116 generated by software provided on the drives 120, 150 (e.g., the removable drive managers 130, 160).

FIG. 1 illustrates two of the embodiments of a removable drive 120, 150 that can be used within the system 100. Briefly, the removable drive 120 is configured for storing one or more private files 118 from a computer system 110 in one mega or combined encrypted file 144 whereas removable drive 150 is adapted for creating one or more folders 174 in which each of the private files 118 that is stored on the drive 150 is retained as a separate encrypted file 176 that can be selectively decrypted and later re-encrypted. These differences are described in fuller detail below.

As shown, the removable drive 120 includes a removable drive manager 130 that is software resident on or provided on the drive that functions to generate a user interface 116 on an interfaced computer system 110, provides secure data functions, and file management functions. To provide security, the removable drive manager 130 includes an encryption module 132 that includes a key generator 134 for generating random keys from a password provided by a user via the security interface 116. For example, the key 142 shown stored in memory 140 of the drive 120 (and memory 140 may also store unencrypted or public files/data 148). The encryption module 132 also includes a cryptography algorithm 136 that functions to encrypt private files 118 to form an encrypted file 144 and to decrypt the encrypted file 144 for viewing on computer system 110 upon verification of a user password. The removable drive manager 130 further includes a file generator/manager 138 that functions to allow a user to select files for inclusion in encrypted file 144, to generate directories/folders, and the like.

In some preferred embodiments, the cryptography algorithm 136 is an implementation of the Advanced Encryption Standard (AES). The AES is a block cipher that has been adopted as an encryption standard by the U.S. government and is used worldwide. When using the AES for the algorithm 136, block sizes of 128 bits are used during encryption and the key 142 typically has a key size of 128 bits (but 192 or 256 bit keys may be used). Operation of the AES is not described in detail herein as it has been analyzed extensively and is well-known and proven acceptable for blocking attacks or attempts to decipher data encrypted according to the AES with key lengths or sizes over 128 bits, which provides very strong security. The key generator 134 takes a password of eight or more characters and creates a random key 142. The key 142 is a piece of information that controls operation of the cryptography algorithm 136. Generally, in encryption, a key specifies the particular transformation of plaintext into ciphertext or vice versa during decryption. For the AES, enciphering the same plaintext but with a different key produces totally different ciphertext stored in file 144 (e.g., a password that creates a key is required to decipher the encrypted file 144 properly). The cryptography algorithm 136 can be described as a symmetric key algorithm as the same key is used for both encryption and decryption.

The removable drive 150 is similar to the removable drive 120 in that it includes a removable drive manager 160 with an encryption module 162 having a key generator 164 and a cryptography algorithm 166. The drive manager 160 also includes a file generator/manager 166 for managing file management such as directory and folder creation and storage of data on the drive 150 in memory 170. The memory (e.g., solid state) 170 stores one or more keys 172 and private folder(s) 174 with one or more encrypted files 176. Public files 178 with unencrypted data may also be stored on the drive 150. The drive manager 160 differs from the drive manager 130 in that the file generator/manager 168 and encryption module 162 work in combination to allow a user to store more than one encrypted files 176. In other words, a user may select two or more private files 118 for storage as encrypted files 176, and the drive manager 160 acts to encrypt each file separately rather than combining the files into a larger file prior to encryption. The files 176 may further be arranged in folders 174. This allows a user to selectively decipher or decrypt one or more of the encrypted files 176, which speeds access to the secure data when compared with accessing a larger file (such as encrypted file 144 of drive 120). Additionally, the key generator 164 may be used to generate different passwords for different ones of the encrypted files 176 (or based on folder 174 containing the files 176), which allows multiple users to use the drive 150 and/or a single user to link differing passwords/identifiers with different data.

Figure 2A:
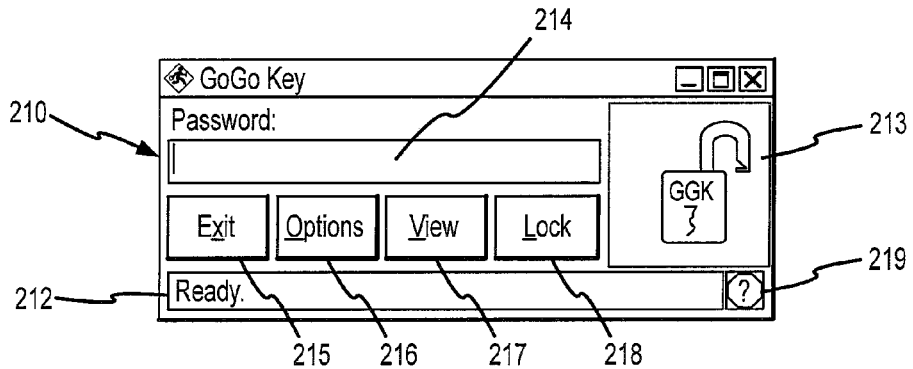
FIGS. 2A-2C show user interface (or security interface) embodiments that may be provided by the removable drive manager application provided on removable drives, such as those shown in FIG. 1.
Figure 2B:
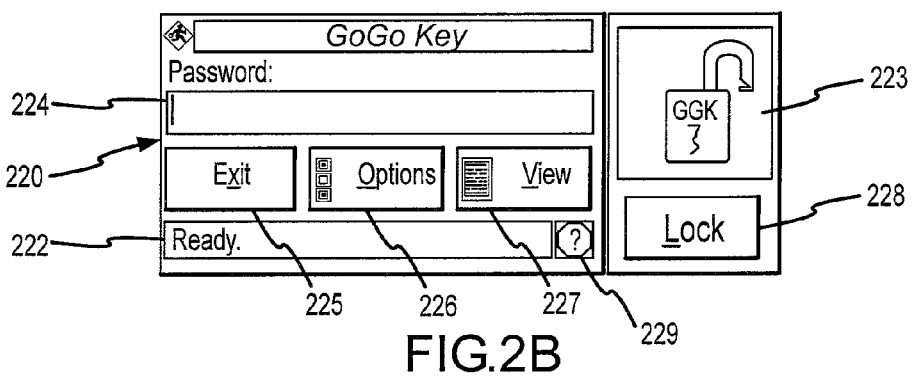
Figure 2C:
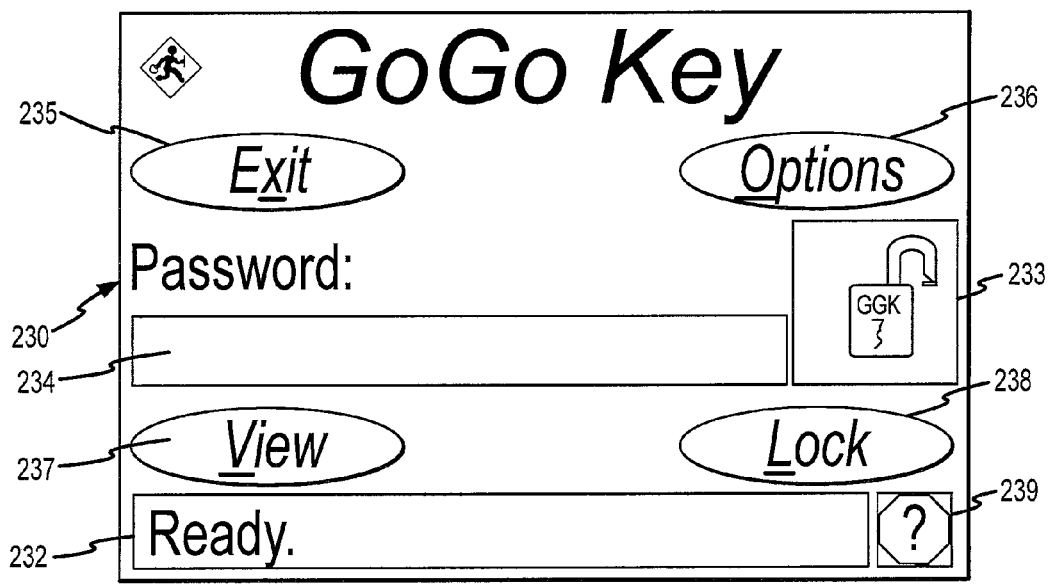

To better understand the drive managers 130, 160, it may now be useful to describe use and/or operation of the removable drives 120 and 150 with a computer system 110. FIGS. 2A-2C illustrate a few embodiments of the security interface 116 that are generated when a user plugs in or connects the removable drive 120 or 150 with USB port 114 and selects (e.g., double clicks) to run the removable drive manager 130, 160 (e.g., an icon may be generated via operation of the OS 112 that is presented on the desktop displayed on monitor 115 or the drive manager 130, 160 may be selectable as a removable drive or the like). Each interface 210, 220, 230 in FIGS. 2A-2C provides a simple and intuitive user interface. Most users are able to encrypt their files for storage on the drive 120, 150 within minutes without any additional instruction. Each interface provides or opens a drag and drop interface (such as interface 310 of FIG. 3) that is intuitive for users and particularly for users familiar with existing user interfaces. The look and feel of the interface 116 may be altered as long as a user is able to provide their password (by typing or speech recognition technology), to select files for encryption and decryption, and to initiate encryption and decryption (locking and unlocking).

With reference to FIG. 2A, the user interface 210 includes a status bar 212 that shows or indicates the status of the drive manager 130, 160 (e.g., shows what the drive software is presently doing). A symbolic status area 213 is also provided that shows whether the data on the drive memory 140 are currently locked or unlocked, with unlocked or unencrypted being illustrate in FIG. 2A. The interface 210 also includes a text box 214 in which a user can type (or otherwise enter) their password (e.g., an 8 character or longer password). A number of action buttons are also provided to allow a user to initiate actions (or subroutines) of the drive manager 130, 160. For example, an exit button 215 is provided for a user to end or exit the drive manager 130, 160 program. An options button 216 is provided that allows a user to perform a number of optional functions such as changing their password or altering the look and feel of interface 210 (e.g., selecting differing colors, fonts, or even differing embodiments such as interfaces 220, 230). A view button 217 is provided to link the user to another screen or interface that enables the user to view, add, and/or remove files to the drive 130, 160 in the private or public files sections of the memory 140, 170. For example, selecting the view button 217 may result in an explorer or navigator of the OS 112 (such as Windows Explorer) to view, add, and/or remove files from drive 120, 150. A lock button 218 is provided to allow a user to encrypt or lock one or more selected files on the drive 120, 150 (or vice versa to unlock or decrypt files stored securely on the drive 120, 150), e.g., button selection initiates an encryption or decryption routine of the removable drive manager 130, 160. Further, a help button 219 is provided to allow a user to request help or assistance information regarding operation of the drive manager 130, 160.

To use a removable drive 120, 150, a user simply has to interface the drive 120, 150 with a USB port 114 and select or initiate the removable drive manager 130, 160 via the OS 112. The interface 210 is displayed on the system monitor 115 (e.g., as security interface 116) and the user enters a password in box 214. The drive manager 132, 162 verifies the password, which allows the user to select the view button 217 to access files stored on the memory 140, 170 or to add files from system memory 117 to the drive 120, 150. The lock or unlock button 218 is selected to encrypt files (e.g., when a user wants to remove the drive 120, 150) or to decrypt files 144, 176 (e.g., when the user wants to modify files or store the files on the system 110 as private files 118).

In some embodiments, the options button 216 takes the user to a screen or interface (not shown) that allows the user to enter contact information or identifying information. This information may then be displayed (or be accessible) when the drive 120, 150 is next inserted into a USB port 114 of a computer system 110. This allows a user to identify the drive 120, 150 with their contact or identifying information, which may be stored in public file 148, 178 (e.g., not encrypted data). The identifying information may replace the "GoGo Key" header of the interface 210 for use in personalizing the interface 210. Further, the contact information allows a different user that finds a lost drive 120, 150 to quickly identify the owner or person to whom the drive 120, 150 should be returned, which is useful since many drives 120, 150 are not adapted for providing contact information on external surfaces (e.g., due to their size and/or cosmetic externals designs).

FIG. 2B illustrates another interface 220 that may be generated by the drive manager 130, 160. A status bar 222 and a status symbol area 223 are provided in the interface 220 along with a password textbox 224, an exit button 225, an options button 226, a view button 227, a lock button 228, and a help button 229. Each of these portions of the user interface 220 has similar functionality and purposes as for the interface 210. FIG. 2C shows another interface 230 with similar components but a different look and feel as interfaces 210 and 220. Specifically, the interface 230 includes a status bar 232, a status symbol area 233, a password entry textbox 234, an exit button 235, an options button 236, a view button 237, a lock button 238, and a help button 239.

Figure 3:
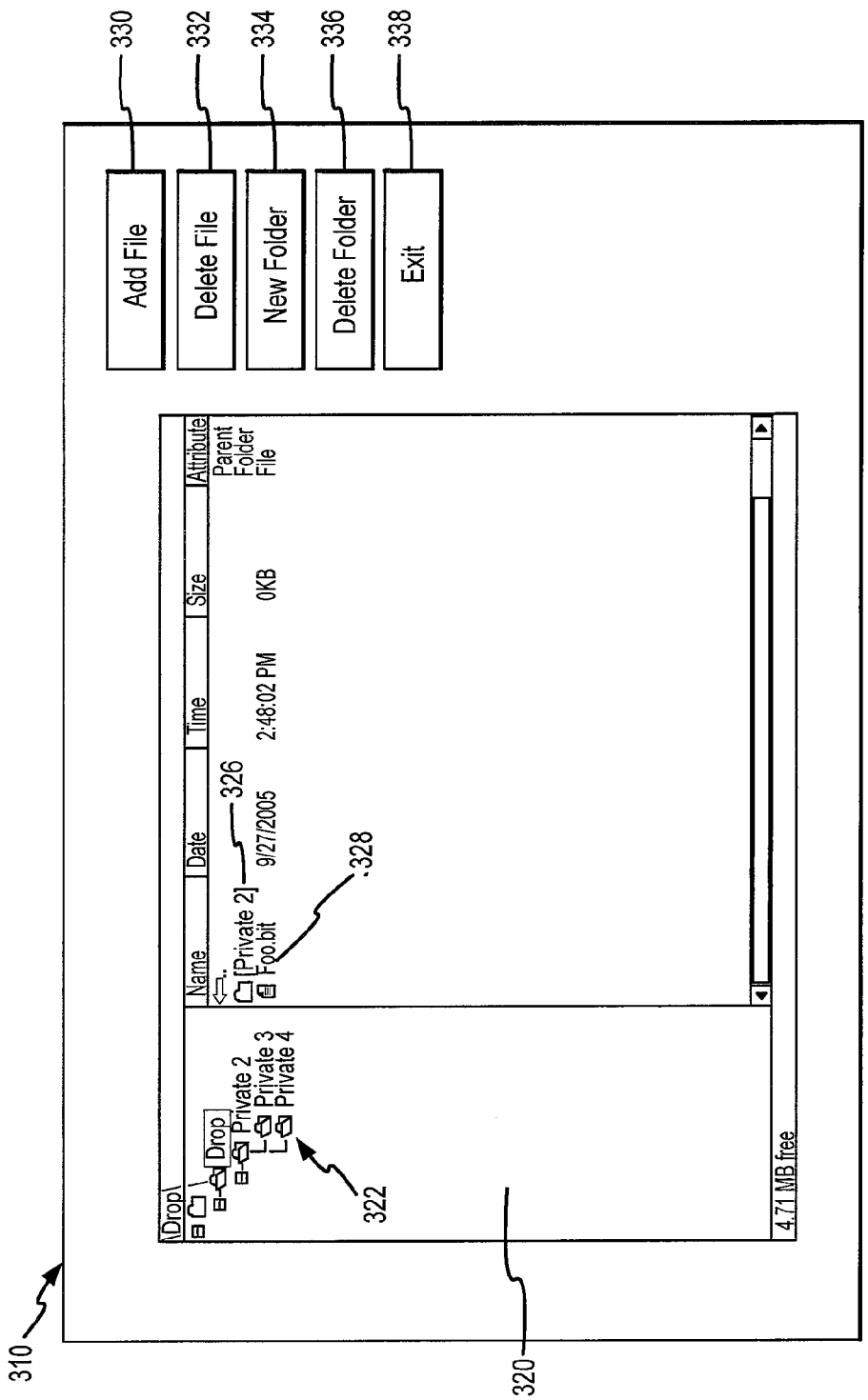
FIG. 3 is a user interface that may be provided as part of or separate to the security interfaces of the invention such as by linking from the security interface to allow users to create or organize folders and add or delete files from private or secure folders.

When the view button is selected in a user interface, the drive manager 130, 160 along with the file generator/manager 138, 168 act to allow a user to view files on the drive memory 140, 170 and to easily add files to the memory 140, 170 (such by selecting, dragging, and dropping into or out drive 120, 150). To this end, FIG. 3 illustrates an exemplary file management or view interface 310 that may be created by the drive manager 130, 160 when a user selected a view button from the security interface 116. As shown, the view file interface 310 includes a file organization or hierarchy area or portion 320, with symbols 322 illustrating a hierarchy of a file directory and folders of a drive memory (such as memory 140 or 170). A separate window or portion shows a selected folder 326 (labeled "Private2") that is opened and contains a user file represented by symbol 328. During operation, a user may create the directory and folders shown for installation on drive 120, 150 and may select files for accessing (e.g., select for decryption) and/or add additional files (e.g., by selecting a private file 118 from a desktop or another folder (not shown) and dragging and dropping the file into one of the folders shown in interface 310).

As shown, a number of action buttons are provided that allow a user to manipulate their files/data. As shown, a user may select to add a file with button 330 or to delete a file 332 (such as selecting a file and then selecting the delete file button 332). A user may select the new folder button 334 to initiate a routine of the drive manager 130, 160 that allows the user to add a new folder (such as folder 326). A user may also select button 336 to run a subroutine or portion of the drive manager 130, 160 to delete a previously created folder on the drive 120, 150 (such as folder 174). The exit button 338 allows the user to exit the file management or view interface 310 and return to the prior interface (such as one of the interfaces in FIGS. 2A-2C).

The removable drive manager 130, 160 is preferably adapted to use very few resources of the computer system 110. When the removable drive 120, 150 is inserted into the port 114 for the first time, support files (such as one, two, or more files) are typically automatically installed on the computer system 110 in a manner that is transparent to the user, and these files provide functional support for the removable drive manager 130, 160. The two files can be removed by following the instructions when a user selects the option button 216, 226, 236 of a user interface 210, 220, 230. No footprint of the encryption process is left behind, and all other functions are performed on the removable drive 130, 150. For example, in some embodiments of the removable drive manager 160, a driver (not shown) may be provided on the computer system 110 that interfaces with the OS 112. This driver acts to decrypt files when they are opened by a user whose password has been verified and to encrypt the files when they are closed (e.g., a user that can access the OS 112 (such as Windows Explorer of Windows OS's) can access their files without requesting the drive manager to encrypt or decrypt their files), with the decrypting and encrypting being performed with the cryptography algorithm 166 (e.g., an AES implementation).

In one Microsoft Windows implementation, the two files that are installed on the client's computer 110 are "Comdlg32.ocx" and "SBcae104.dll." Comdlg32.ocx is a library of common dialog functions for Microsoft Windows. Typically, this file should already exist on the client's computer. However, it is no guarantee that the file will be there. If it does not exist, the drive manager (or some other component) on the removable drive copies the file to the user's system directory. SBcae104.dll is a dynamic link library for the AES encryption engine (e.g., encryption module and/or cryptography algorithm). This library is used to encrypt/decrypt the PC8 file (files marked for private storage on the drive) for the drive manager.

The copying of these files preferably happens automatically, with the files not being copied if they are not needed on a particular computer system (e.g., already installed/existing). There are at least two reasons for copying the files to the user's computer: 1) Access to the libraries are faster when used on the hard drive (as opposed to only on the removable drive, e.g., USB flash drive) and 2) A user might delete the file from the USB flash drive thinking that the file is not needed.

Prior to the invention, encryption techniques for USB flash drives required that the encryption program (i.e., the encryption module 132, 162) be installed on the client's computer. The setup portion may be located on the USB flash drive, but some even require a download from the Internet or other media to get the initial setup portion. The encryption system and method described herein is the only encryption program that resides on the USB flash drive. Further, it is the only removable drive methodology that requires no setup. The encryption/decryption activities occur on the flash drive (unless the drive is low on disk space) and the two files discussed above that are sometimes copied to the client's computer may be removed easily.

Figure 4:
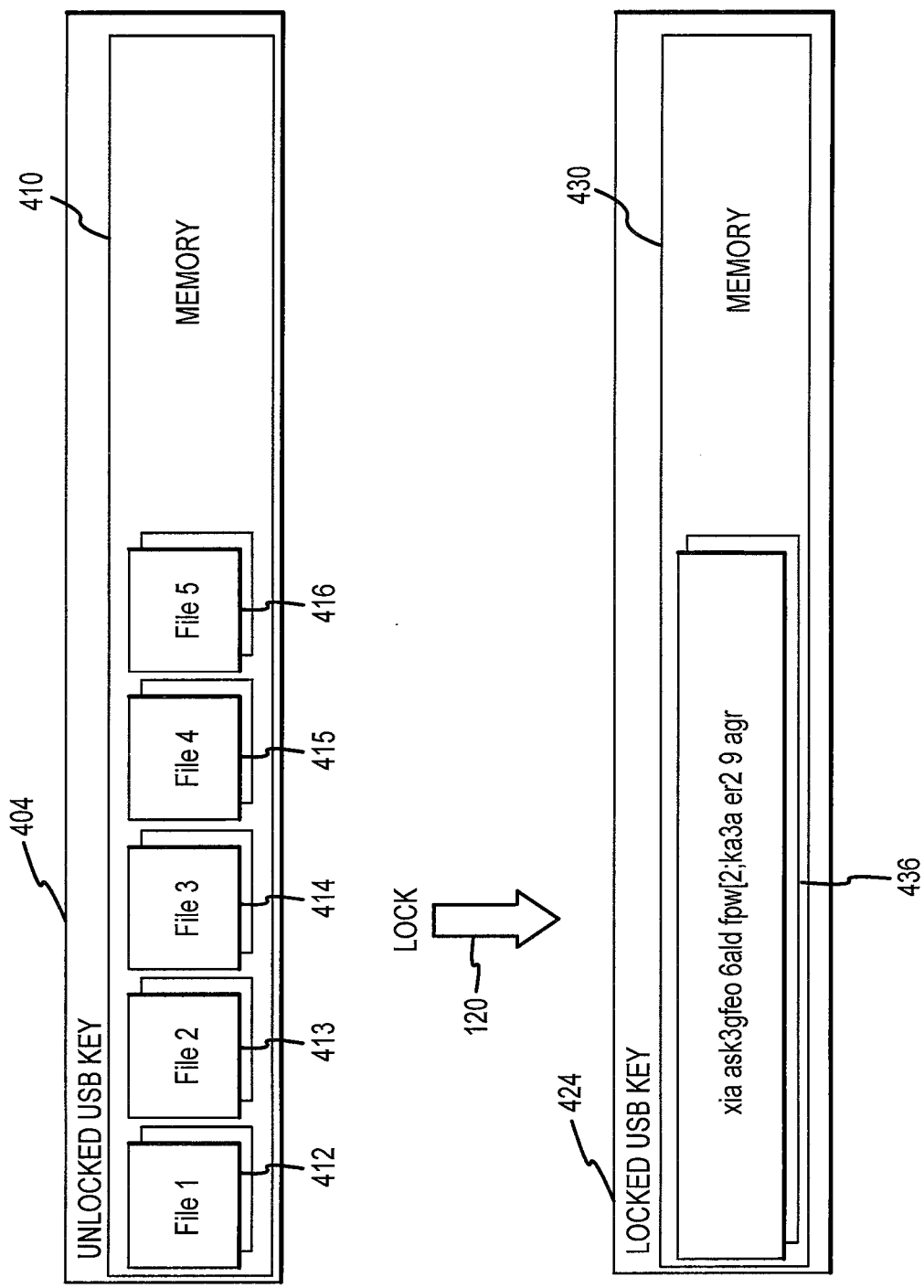
FIG. 4 illustrates the "locking" process of one embodiment of the invention in which a number of files marked private or secure are first combined and then encrypted as a single larger or megafile for storage on a removable drive.

The removable drive 120 is operable to merge a number of files into one file and then encrypt that megafile (and vice versa during decryption or unlocking). This operation is shown in FIG. 4 and will be explained with added references to FIG. 1. A user of computer system 110 may select a number of private files 118 for adding to memory 140 of drive 120. For example, as shown in FIG. 4, a user may select to add five files 412, 413, 414, 415, and 416 to memory 410 of a USB key 404 (shown as an "unlocked" key). When the user then selects a "lock" button (such as in one of the interfaces 210, 220, 230), the removable drive manager 130 acts to lock or secure 420 the files 412-416 to create an encrypted megafile 436 in the memory 430 of the locked USB key 424. Typically, the key generator 134 generates a key 142 and the file generator/manager 138 acts to combine all of the files 412-416 into a single file, which may contain all of the files plus a file directory that is created by the file generator/manager 138 (or another routine of drive manager 130). The encryption module 134 with the cryptography algorithm 136 and key 142 acts to encrypt the megafile to create an encrypted file 144 or 436 in which all the data is encrypted (e.g., encrypted using AES) and the user's password is required to decrypt the private or secure data. Decryption would involve the user selecting the encrypted file and selecting the unlock button to start the decryption routine or module 132 of drive manager 130. The removable drive manager 160 of drive 150 acts, in contrast, to allow a user to encrypt/decrypt files 176 individually (or as subset such as all files in a folder 174).

When a file is deleted from memory 140, 170 the removable drive manager 130, 160 preferably uses a method deletion that prevents a file recovery program to recover and recompile the file into meaningful data. For example, the drive manager 130, 160 may use a method of deletion that has been approved by the U.S. National Security Agency (NSA) or the like. This deletion method may involve the manager 130, 160 first filling the file with randomized data and then changing the file name to a random name. Then, the file may be deleted from memory 140, 170.

Figure 5:
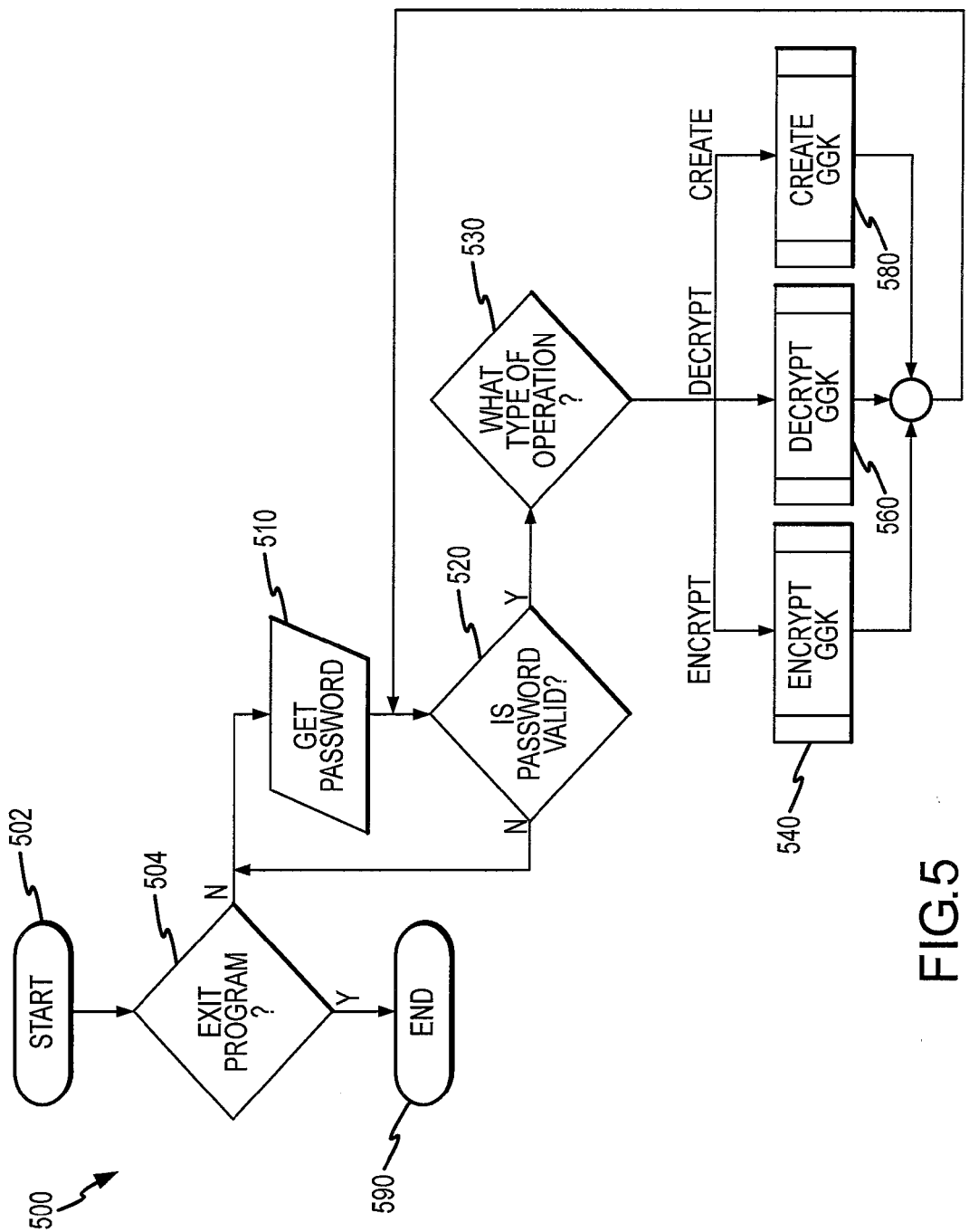
FIG. 5 illustrates general flow or processes of a removable drive manager application (e.g., a main routine of software provided on a USB key or the like)

FIGS. 5-18 illustrate in more detail various operations or routines performed by an exemplary removable drive manager (such as manager 130, 160) provided in a removable drive (such as a USB key or the like). A main routine 500 provided by a drive manager is shown in FIG. 5 with the routine 500 starting at 502 such as when a user selects a related icon on their desktop or selects a removable drive associated with a USB port. At 502, the drive manager acts to display a security or user interface (such as those shown in FIGS. 2A-2C). At 504, the drive manager checks for selection of the exit button or another indication that the program is to be exited (such as by unplugging of the removable drive from the port). If exit is indicated, the main routine 500 ends an 590. If not, the drive manager waits for receipt of a user password at 510. Once received, the password is verified at 520, and this operation may include generating a random key with a key generator process and comparing the generated key with a previously stored encrypt/decrypt key. If the password is not determined valid (i.e., not verified as correct), the routine returns to 510 and may also include a step of providing an error to the user via the user interface and/or providing an incorrect password message and prompt the user to try again (with some embodiments, only allowing a preset number of attempts before simply "permanently" locking the removable drive to prevent any further access of the stored data).

At 530, the drive manager determines if an operation is requested by the user. The user may select the lock button indicating selected files should be encrypted at 540 (or encryption may be automatically performed when a file is selected for closing at 530). Similarly, the user may select to unlock or open files at 530 which results in the drive manager performing a decrypt operation at 560. Further, the operation identified at 530 may be to create a new file/folder and this process is performed by the drive manager at 580.

Figure 8:
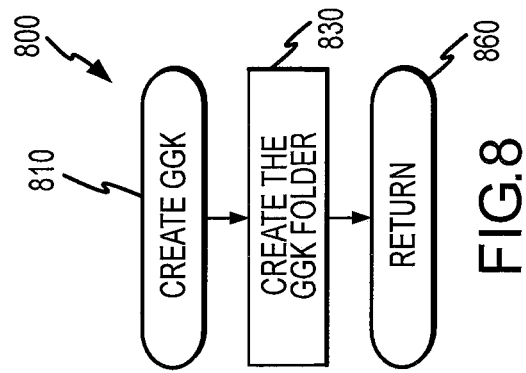
FIGS. 6-8 provide more detail of the encryption, decryption, and folder creation processes performed by removable drive manager instances of the invention.
Figure 7:
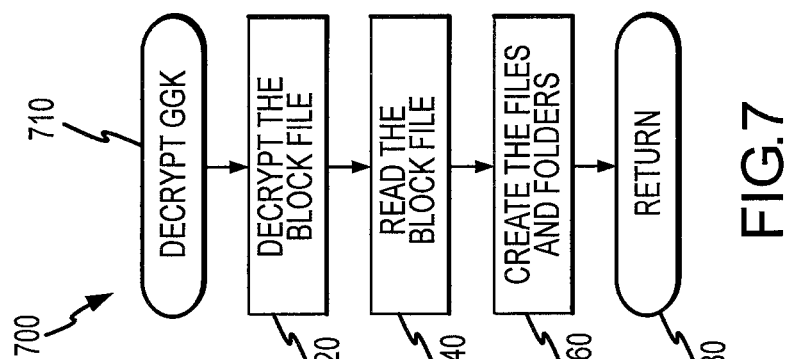
Figure 6:
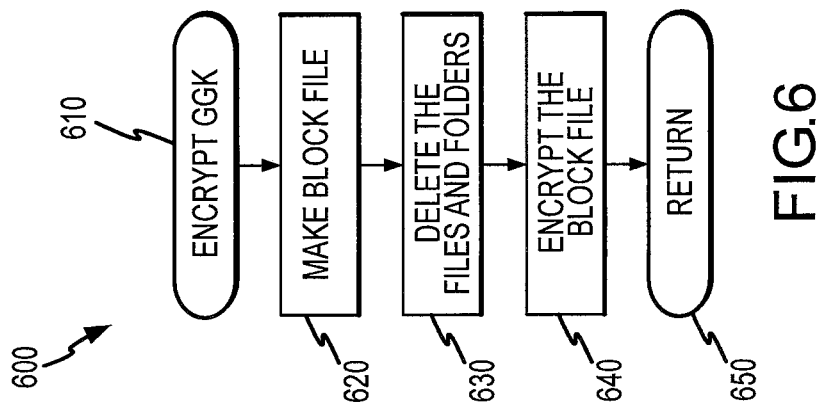

Embodiments of each of these operations 540, 560, and 580 are shown in more detail in FIGS. 6-8. In FIG. 6, an encryption process 600 is shown that starts at 610 such as with a user closing a file (in an automatic embodiment) or with the selection of a lock button in a user interface after selecting one or more files for placement on a removable drive. At 620, the drive manager acts to make a block file, which is a single file created from a combination of all files and folders selected. At 630, the files selected for locking or encryption are deleted along with their folders. At 640, the created block file is encrypted using a password-based key and a cryptography algorithm (such as AES). At 650, control is returned to the main routine 500.

In FIG. 7, a decryption process 700 is shown that starts at 710 such as with a user opening a file (in automatic embodiments) or a user selecting a file and the unlock button. At 720, the selected block file stored on the removable drive is decrypted using the key and a cryptography algorithm (such as AES). At 740, the decrypted block file is read, and at 760, the drive manager acts to create the files and folders defined by the decrypted block file. Control is returned at 780 to the main routine 500.

In FIG. 8, a creation process 800 is shown that starts at 810. This process is executed automatically at 830 by a removable drive manager (e.g., "GoGo Key" or "GGK") to create the private folder and to return control to the main routine 500 at 860. This is done when the drive manager program is run for the very first time or when the user deletes the private folder and it does not exist anymore.

FIGS. 9-11 illustrate routines that may be performed by a removable drive manager as part of generating and receiving input from a user interface on a computer system. FIG. 9 shows an initiate user interface process 900 that starts at 910 such as when a user connects a removable drive and selects to execute the removable drive manager. At 920, the user interface is initiated and at 930, the drive manager acts to change/update logo or initial display executables. At 940, the drive manager may act to show an identifier or logo for a company, such as the manufacturer or distributor of the drive manager or removable drive. At 950, the logo is replaced or supplemented with the user interface screen (such as screens shown in FIGS. 2A-2C). At 960, the process 900 determines if an exit button has been selected or the drive manager should exit for other reasons, and if so, the process 900 ends at 980. If exit is improper, the process 900 continues in a loop to process events at 970, e.g., a user selection of a button on the interface, and check for exit at 960.

FIG. 10 illustrates the initiation process 920 in more detail as process 1000. At 1010, the initiation of the drive manager is provided and at 1020, the OS or USB driver gets the USB key drive or removable drive and sets up the drive manager variables at 1030. At 1040, the OS opens EXE storage variables for the drive manager and retrieves settings associated with the drive manager. At 1060, the operating system version is determined by the drive manager, and at 1070, the OS determines if the drive that is provided in the USB port is valid and whether or not the drive manager or GGK program is on the appropriate drive. This is determined, in some embodiments, by an identifier of the removable drive (e.g., by the serial number of a USB flash drive or the like). For example, each drive manager may be configured or created to work on only one removable drive (e.g., only on one USB flash drive), i.e., on one drive not on a whole model or series of drives. To provide limited access to files, the drive manager may allow access to files when on an incorrect drive but will not decrypt, but in other cases, the drive manager may only allow access and decrypt when on the correct removable drive. If not, the initiation is terminated at 1090. If a valid drive, the process 1000 continues at 1076 with checking DLLs and the registry, at 1080 setting up icons and buttons for the interface of the drive manager, and returning control to routine 900 at 1086.

Figure 12:
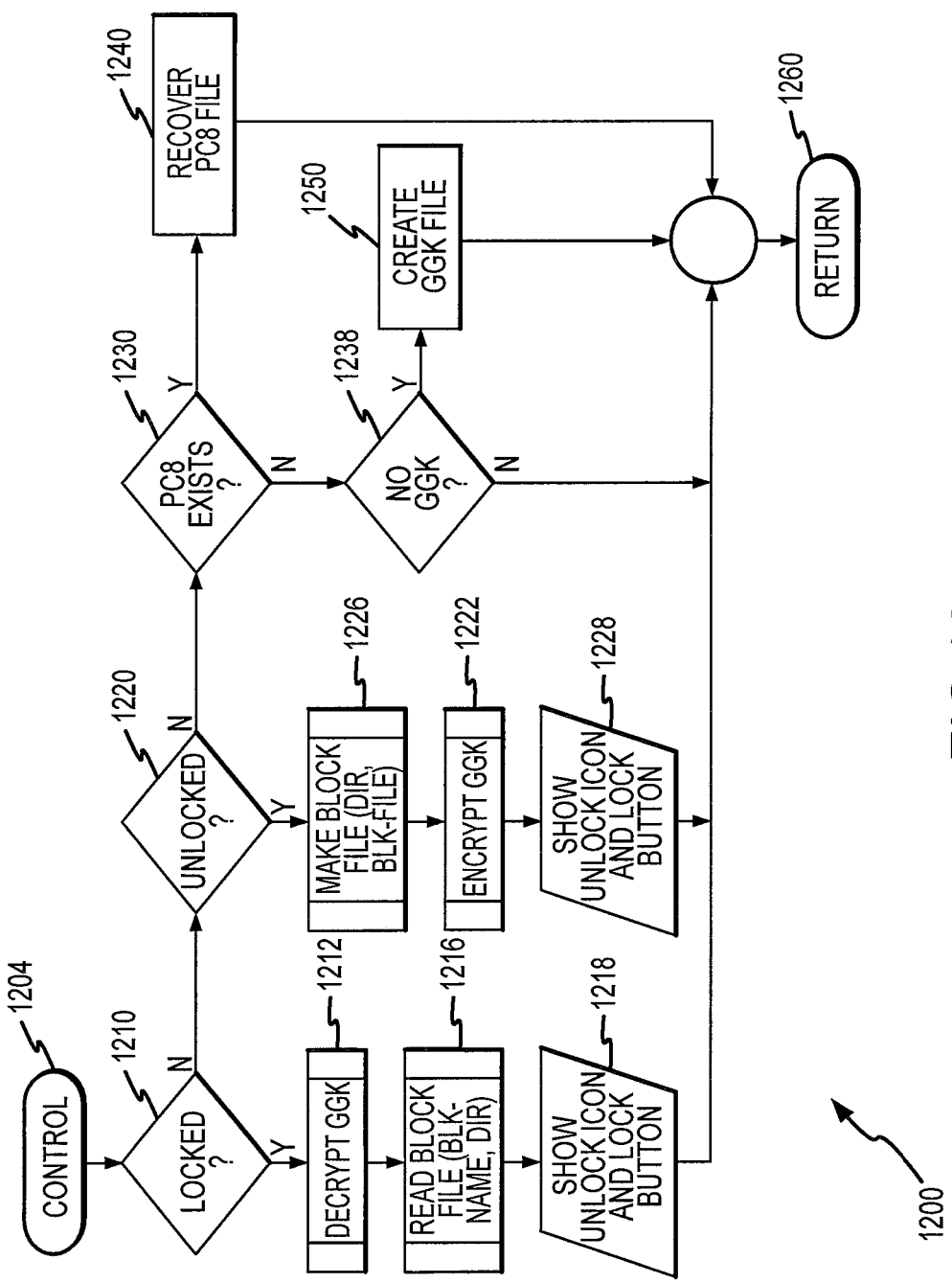
FIG. 12 shows further details of processes performed by a removable drive manager of the invention.

FIG. 11 shows a process 1100 in which a removable drive manager processes a user selection of one or more user interface buttons. At 1110, the process 1100 starts such as with a user selecting the lock or unlock button or selecting to add/create a file or folder (e.g., via the view button/link). At 1120, the process 1100 continues with disabling the buttons so that further input/events cannot be entered by a user. At 1130, the user's password is verified and if not, an error message is displayed at 1140. If the password is determined valid, a control process 1150 is begun (as shown in FIG. 12). When the control process is completed (e.g., the event is processed), the buttons in the interface are enabled again at 1160 and control is returned to process 900 (e.g., in loop at 960 and 970) at 1190.

Figure 16:
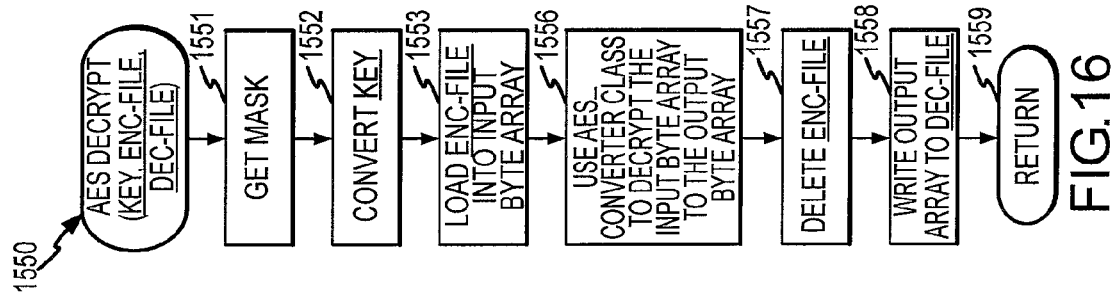
FIGS. 15 and 16 are similar to FIGS. 13 and 14 but show exemplary decryption processes performed by an encryption module.
Figure 15:
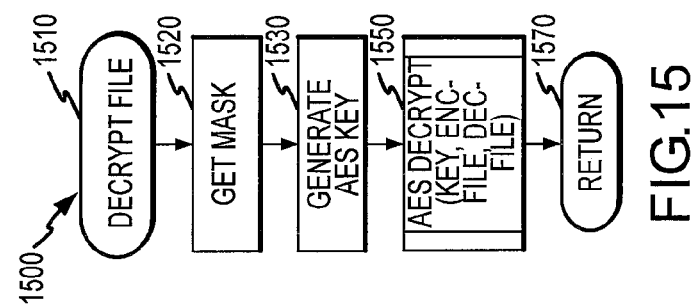

FIG. 12 shows one exemplary control process 1150 as process 1200. As shown, the process starts at 1204 and a determination of whether the event or action is to lock or secure one or more selected files is determined at 1210. If yes (e.g., the lock button was selected or a file was closed), a decrypt process 1212 is begun. An example is shown in FIG. 15 at 1500. File decrypting 1500 is started at 1510 such as with receipt of a file selection. At 1520, the drive manager gets a mask and then at 1530 generates a decrypt key (e.g., an AES key). At 1550, the file is decrypted. This is shown in FIG. 16 at 1550 with a key and encrypted file being used to generate a decrypted or unlocked file. At 1551, the mask is retrieved and at 1552 the key is converted per the cryptography algorithm. At 1553, the encrypted file is loaded into an input byte array. At 1556, the cryptography algorithm (or a class of a cryptography algorithm such as AES) is used to decrypt the input byte array into an output byte array. At 1557, the encrypted file is deleted, and at 1558 the output array is written to a decrypted or unlocked file. At 1559, control is returned to process 1500. At 1570 of process 1500, control is returned to process 1200 of FIG. 12.

The process 1200 continues at 1216 with the reading of the block file (reading the decrypted file). This process is shown in more detail in FIG. 17 at read process 1700 which starts at 1710. At 1720, the block file is opened, and at 1730 the block file information is read. At 1740, the drive manager (or its file generator/manager) acts to delete the block file and then at 1750 to create a directory folder. This is followed by creating each directory at 1760 and then creating each file at 1770, with control returned at 1790 to the process 1200 of FIG. 12. At 1218, the user interface is updated to show the unlock icon in the status symbol area of the user interface and the "lock" button (in embodiments where the lock/unlock button is toggled from "Lock" to "Unlock" and vice versa to show which actions can be taken).

If at 1210, a file/folder is not locked the process 1200 continues at 1226 with a determination if the file/folder is unlocked and a locked action is requested. If so, then at 1222, a block file is made. This process is shown in more detail in FIG. 18 with process 1800 that starts at 1810. At 1820, the block file information is initiated, and at 1830, a directory list is created. At 1840, a file list is created and at 1850 the files and directories are deleted. At 1860, the block file is written and control is returned at 1890 to process 1200.

Figure 14:
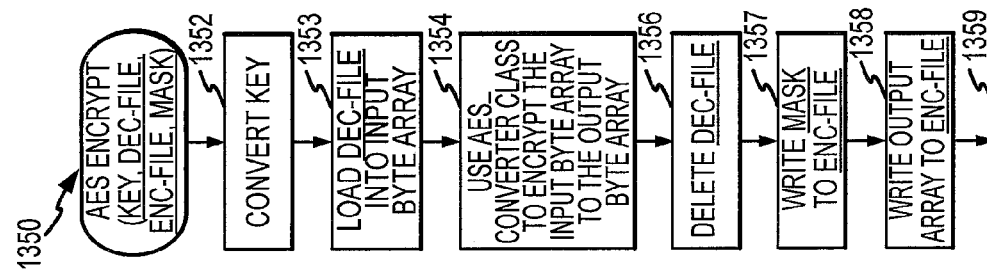
FIGS. 13 and 14 illustrate further encryption processes performed by an exemplary encryption module of a removable drive manager.
Figure 13:
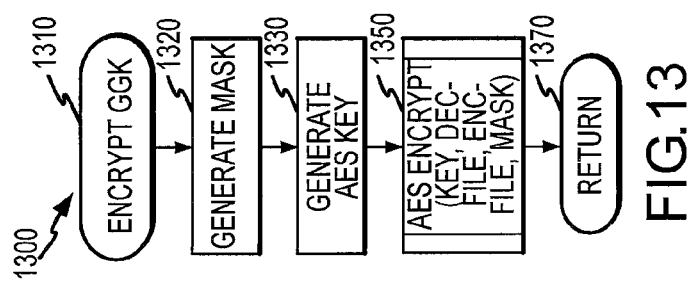

At 1222, the created block file is encrypted. Detail of an exemplary file encryption 1300 is shown in FIG. 13. The process 1300 is started at 1310 such as by passing the block file to an encryption module of a removable drive manager. At 1320, a mask is generated and at 1330, the encryption key is generated from the password. At 1350, the block file is encrypted as shown in FIG. 14 with the key being converted at 1352 and the decrypted block file being loaded into the input byte array at 1353. At 1354, the encryption module of the removable drive manager uses cryptography algorithm (e.g., an AES converter class or the like) to encrypt the input byte array to the output byte array. At 1356, the decrypted block file is deleted and the mask is written to the encrypted file. The output array is then written to the encrypted file at 1358 and control is returned at 1359 to process 1300, which in turn returns control at 1370 to process 1200 of FIG. 12. At 1228, the user interface is updated to show the unlock icon or symbol in the status symbol area and to show the lock button (in embodiments in which lock/unlock button is toggled between lock and unlock to show available actions for a file or files).

The method 1200 may continue at 1230 with determination of whether an unencrypted file ("PC8") exists, and if so, then recovering the PC8 file at 1240 and returning control at 1260. If the PC8 file does not exist, then at 1238, it is determined whether the action is to create new files and if not, returning control at 1260. If the event based on the user input is to create a new secure file for storage on the drive, this action is performed at 1250 (see process 800 of FIG. 8).

The removable drive manager as described above is an application delivered with USB flash drives (e.g., removable drives) that encrypts selected data on the flash drive. When the drive manager is used with a flash drive, there is in some embodiments a special folder that contains all the private (encrypted) data. Any data not in that folder will be public or unencrypted. In some preferred embodiments, the removable drive manager uses AES as its encryption engine, e.g., as part of its encryption module.

The private folder on the flash drive is actually a file that contains all of the files dropped or placed into the folder. In some embodiments of the invention, this file is arranged in a special format called the Encrypted File System (or EFS), which was specially developed for this purpose. All files placed in this file system are encrypted based on the user's password. Individual files may be encrypted with another password or compressed to save space. Using a separate file system for the drive manager allows the program to encrypt/decrypt individual files on the fly without having to encrypt/decrypt all of the files stored in the file system (e.g., see the drive 150 of FIG. 1). Files may be organized in the file system by using folders and sub-folders. The view screen 310 as shown in FIG. 3 allows the user to add, remove, modify, and open files stored in the private folder. This screen provides a user with the capability to drag and drop files and folders from the users desktop or OS navigator into the private folder. The left side of the screen 310 at 320 shows the folders in the private folder. These are displayed in a tree view. The top of the screen shows the current location (in this case "\drop\".) The middle of the screen shows the files and folders in the current location.

One embodiment of the EFS file system is a binary file that stores files and folders. An EFS file can have any actual file name. The EFS has the following sections (with sizes provided in bytes and all locations starting at byte 1):
 Encrypted File System Information (EFS-Info)
 Entry Block (EB)
 Entry Block Data (EB-Data)
 Entry Block Directory (EB-Dir)
To create an EFS file, it should first be determined how big the file should be. The default may be 5 megabytes or some other useful size. The beginning of the file contains the header information. The majority of the EFS file is broken into small chunks called entry blocks. As a result, the size of an entry block should also be determined, with a useful default being 1024 bytes and, preferably, EFS can be resized later (either manually or automatically) to hold more or bigger files.

The EFS-Info section is at the beginning of the file and is 20 bytes long in one embodiment. The EFS-Info section includes the following fields:
 Entry Block Size; Long Integer (4 bytes); This is the size of a single entry block. Default is 1024.
 Number of Entries; Long Integer (4 bytes); This is how many entry blocks exist in the encrypted file system. Example:
  EFS2 file size is 5,000,000 bytes.
  Subtract 20 bytes (for the EFS-Info) from the total size. This gives us 4,999,980 bytes.
  Entry block size is 1024 bytes
  4,999,980÷1024 is 4882.79296875.
  Number of entries will become 4882 (drop the fraction.)
 Space; Long Integer (4 bytes); How much unused space is at the end of the file system. Since the number of entry blocks does not evenly divide into the amount of space there will almost always be some left over. Example:
  We have 4882 entry blocks.
  4882×1024 bytes is 4,999,168 bytes.
  4,999,168 bytes+20 bytes is 4,999,188 bytes.
  5,000,000−4,999,188 is 812 bytes.
  Space is 812 bytes.
 Free Entries; Long Integer (4 bytes); This is the number of entry blocks that have not been used. Each time an entry block is allocated for a file or folder 1 or more will be subtracted from the free entries. When a file or folder is deleted 1 or more will be added to free entries. When the EFS2 file is created this will be set to the number of entries minus 1 (for the root directory.) Example:
  We have 4882 entry blocks.
  The root directory (which will always exist) takes up 1 entry block.
  Free entries is 4881.
 Free Space; Long Integer (4 bytes); This is the amount of space, in bytes, that is available. It is calculated by taking free entries and multiplying by the entry block size. Example:
  There are 4881 free entries.
  An entry block is 1024 bytes.
  4881×1024 bytes is 4,998,144 bytes.
  Free space is 4,998,144 bytes.
The entry block consists of 1 or more sub-sections. These sections are:
 Entry Block Head (EB-Head)
 Entry Block Name (EB-Name)
 Entry Block File Information (EB-File-Info); For files only.
 Entry Block Data (EB-Data); For files only.
 Entry Block Dir (EB-Dir); For directories only.
The EFS2 file consists entirely (except for the 20 bytes at the beginning and a few bytes at the end) of entry blocks. When the EFS2 file is created all entry blocks are filled with zeros.

The entry block head is 9 bytes long and is typically present at the beginning of an entry block. The EB-Head has the following fields:
 Attributes; Byte; Attributes for the entry block. Attributes are:
  Bit 7=Block is used. If a block is used it cannot be allocated for another dir/file. Files and directories can be deleted by setting this bit to 0.
  Bit 6=Block is a continued block. A file can get much bigger than the entry block. If this bit is set to 1 it indicates that it is a continuation of another block. Please note that the first block of a file or directory does not contain a 1 at this position.

Bit 5=Block is a directory. If 1 then this block contains directory data. If 0 then this block contains file data.
Bit 4=Dir/File is read-only.
Bit 3=Unused.
Bit 2=Unused.
Bit 1=Block is compressed.
Bit 0=Block is encrypted.

Previous Block; Long Integer (4 bytes); For a continuation block this is the location (in bytes) of the previous block. If this is the first block (or only block) of a file or directory then this is the location of the parent directory that contains the file (or directory.) If this is the root directory then this field is always set to −1.

Next Block; Long Integer (4 bytes); If there is a continuation block after this block then this is the location of that block. If not then this field is set to −1.

The EB-Name section is used only in an entry block, after the EB-Head section, and only in the first block (or only block) of a file or directory. This section is not present in a continued block. The EB-Name section has these fields:

Entry Name Size; Byte; Size of the dir/file name in bytes. Example:
File name is "MyList.txt".
Entry name size will be 10.

Entry Name; String (? Bytes); The actual dir/file name. String is NOT null terminated.

For the root directory the name is preferably "\".

The EB-File-Info section is typically used only in an entry block, after the EB-Name section, and typically only in the first block (or only block) of a file. This section is not present in a continued block or in an entry block that contains directory data. The EB-File-Info section is 32 bytes long. The EB-File-Info section has these fields:

File Size; Long Integer (4 bytes); Size of the file in bytes.
File Modification Date; Date/Time (8 bytes); The date and time when the file was last modified. Format is IEEE 64-bit floating point.
Key; 5 Long Integers (20 bytes); Encryption key for the file.

The EB-Data section contains the actual file data. It follows the EB-File-Info in the first block (or only block) or the EB-Head in a continued block. The EB-Data section is used only for files, never for directories. EB-Data has only one field, Entry Data. Entry data is an array of bytes that contain the data (or part of the data) of a file. If the file fits in one entry block then any unused bytes will be filled with zeros. If the file is larger than the entry block then as much of the file is put in EB-Data and the rest will be placed in a continued block.

The EB-Dir section contains the data for a single directory. It follows the EB-Name section in the first block (or only block) or the EB-Head in a continued block. The EB-Dir section has these fields:

Directory Entries; Long Integer (4 bytes); Number of files and sub-directories that this directory contains.

Directory List; Array of long integers; Locations of files and sub-directories that this directory contains. If an entry does not have a file or directory attached to it then it is set to 0;

After the EFS file has been created the first entry block attributes are marked as used and is a directory, and −1s are placed in the previous block and next block fields in the very first EB-Head section. The first EB-Head is at location 21, and the attributes are at 21. The first previous block field is at 22. The first next block field is at 26.

Example Empty EFS2 File (Size is 5 Megabytes, Entry Block Size is 1024 Bytes)

| Location | Data | Description |
|---|---|---|
| 1 | 1024 | Entry block size. |
| 5 | 4882 | Number of entry blocks. |
| 9 | 812 | Unused space at end of EFS2 file. |
| 13 | 4881 | Number of free entry blocks. |
| 17 | 4998144 | Number of free bytes. |
| 21 | 10100000 | Attributes for the first entry block. |
| 22 | −1 | Root directory. |
| 26 | −1 | No continued blocks. |
| 30 | 1 | Name is 1 character. |
| 31 | \ | Name is "\" (root directory.) |
| 32 | 0 | There are no entries. |
| 36 | 0 | $1^{st}$ directory entry (empty.) |
| 40 | 0 | $2^{nd}$ directory entry (empty.) |
| 44 | ... | Directory entries 3 through 252 (empty.) |
| 1044 | | 1 byte of unused space. |
| 1045 | 0000...0000 | 2nd entry block (not used.) |
| 2069 | ... | Entry blocks 3 through 4881 (not used.) |
| 4,997,141 | 0000...0000 | 4882nd (last) entry block (not used.) |
| 4,998,165 | | 812 bytes of empty space. |

Adding a File to the Root Directory

For an example file let's add a file called "Sample.txt" to the root directory.

1. Create a random 160 bit number based on the user's password. Call this number the key.
2. Encrypt the file Sample.txt with the key to a temporary file we will call tmp0001.enc.
3. Our encrypted example file is 30 bytes. Check to see if there are 30 bytes available in the EFS2. The free space field in the EFS-Info section indicates we have 4,998, 144 bytes remaining.
4. Check for free blocks. The free entries field in the EFS-Info section indicates we have 4881 entry blocks remaining.
5. Since the $2^{nd}$ entry block is free we will place the encrypted file there. Set the following attributes:
   a. Used (bit 7) to 1
   b. Continued (bit 6) to 0.
   c. Directory (bit 5) to 0.
   d. Read-only (bit 4) to 1 if Sample.txt is read-only.
   e. Compress (bit 1) to 0.
   f. Encrypt (bit 0) to 0 (file encrypted based on the users password.)
6. Since this file will reside in the root directory the location of the root directory (21) will be stored in the previous block field.
7. There will be no continued blocks. The next block field will store −1.
8. The entry name size field will hold 10 ("Sample.txt" is 10 characters.)
9. The entry name field will hold "Sample.txt" (without the quotes.)
10. The entry size field will hold 30 (the encrypted file is 30 bytes.)
11. The file modification field will hold the modified date and time of Sample.txt.
12. The key field will contain the random number key.
13. The entry data field will contain the encrypted data of the file. Unused bytes will be set to 0.

| Location | Data | Description |
|---|---|---|
| 1 | ... | EFS-Info and $1^{st}$ entry block. |
| 1045 | 10000000 | Attributes for the $2^{nd}$ entry block. |

-continued

| Location | Data | Description |
|---|---|---|
| 1046 | 21 | Location of containing directory (root directory.) |
| 1050 | −1 | There is no continued block. |
| 1054 | 10 | The file name is 10 characters long. |
| 1055 | Sample.txt | The file name. |
| 1065 | 30 | The file is 30 bytes. |
| 1069 | 10:00 am Jan. 1, 2006 | The modified file date. |
| 1077 | 25413385 | The encryption key. |
| 1097 | 39a $~llei . . . wee7#−1 | 30 bytes of encrypted data. |
| 1127 |  | 942 bytes of unused space. |
| 2069 | . . . | $3^{rd}$ entry block. |

14. Subtract 1 from the free entries field in the EFS-Info section.
15. Subtract 1024 from the free space field in the EFS-Info section.
16. Now the file location needs to be stored in the root directory.
17. Find an available directory entry in the directory list. The first directory entry is empty so we will use that. It is at location 36. At that location store the location of the files first entry block (location 1045.)
18. In the root directory's directory entries field add 1 to the number already there. In this case 0+1=1.

| Location | Data | Description |
|---|---|---|
| 1 | . . . | EFS-Info. |
| 21 | 10100000 | $1^{st}$ entry block (root directory) attributes. |
| 22 | −1 | This is the root directory (no containing dir.) |
| 26 | −1 | No continued blocks. |
| 30 | 1 | Directory name is 1 character. |
| 31 | \ | Directory name. |
| 32 | 1 | There is one file in this directory. |
| 36 | 1045 | $1^{st}$ directory entry (file at location 1045.) |
| 40 | 0 | $2^{nd}$ directory entry (empty.) |
| 44 | . . . | Directory entries 3 through 252 (empty.) |
| 1044 |  | 1 byte of unused space. |
| 1045 | . . . | $2^{nd}$ entry block. |

Creating a New Directory

Figure 19:
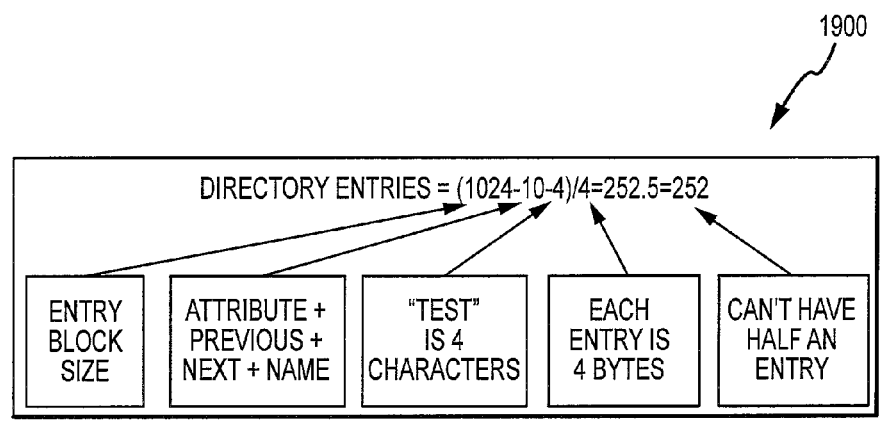
FIG. 19 is a flow diagram of an exemplary method of computing available director entries.

Let's create a new directory in the root called "Test".
1. Check for free blocks. The free entries field in the EFS-Info section indicates we have 4880 entry blocks remaining.
2. Since the $3^{rd}$ entry block is free we will use it for the new directory. Its location is 2069
3. Set the attributes field to use and directory.
4. Since this directory is contained by the root directory set the previous block field to 21 (the location of the root directory.)
5. Since there are no continued blocks, set the next block field to −1.
6. Set the entry name size to 4 ("Test" has 4 characters.)
7. Set the entry name to "Test" (without the quotes.)
8. Set the directory entries field to 0 (there are no files in this directory yet.)
9. Compute how many directory entries are available as shown in flow diagram 1900 of FIG. 19.
10. Fill an array of long integers (4 bytes) of 252 elements with zeros and save it to the directory list.
11. Now the new directory location needs to be stored in the root directory.
12. Find an available directory entry in the directory list. The second directory entry is empty so we will use that. It is at location 40. At that location store the location of the new directory's first entry block (location 2069.)
13. In the root directory's directory entries field add 1 to the number already there.

| Location | Data | Description |
|---|---|---|
| 1 | . . . | EFS-Info. |
| 21 | 10100000 | $1^{st}$ entry block (root directory) attributes. |
| 22 | −1 | This is the root directory (no containing dir.) |
| 26 | −1 | No continued blocks. |
| 30 | 1 | Directory name is 1 character. |
| 31 | \ | Directory name. |
| 32 | 2 | Number of files/directories in this directory. |
| 36 | 1045 | $1^{st}$ directory entry (file Sample.txt at location 1045.) |
| 40 | 2069 | $2^{nd}$ directory entry (directory Test at location 2069.) |
| 44 | 0 | $3^{rd}$ directory entry (empty.) |
| 48 | . . . | Directory entries 4 through 252 (empty.) |
| 1044 |  | 1 byte of unused space. |
| 1045 | . . . | $2^{nd}$ entry block (Sample.txt.) |
| 2069 | . . . | $3^{rd}$ entry block (directory Test.) |

14. Subtract 1024 from the free space field. This is because a directory takes up an entry block.
15. Subtract 1 from the free entries field.

| Location | Data | Description |
|---|---|---|
| 1 | 1024 | Entry block size. |
| 5 | 4882 | Number of entry blocks. |
| 9 | 812 | Unused space at end of EFS2 file. |
| 13 | 4879 | Number of free entry blocks. |
| 17 | 4996096 | Number of free bytes. |
| 21 | . . . | $1^{st}$ entry block. |

Adding a File Larger Than 1024 Bytes

Now to add a file to the Test directory called MyPic.bmp. MyPic is 1800 bytes.
1. Create a random 160 bit number based on the user's password. Call this number the key.
2. Encrypt the file MyPic.bmp with the key to a temporary file we will call tmp0002.enc.
3. Check to see if there are 1800 bytes available in the EFS2. The free space field in the EFS-Info section indicates we have 4,996,096 bytes remaining.
4. Check for free blocks. The free entries field in the EFS-Info section indicates we have 4879 entry blocks remaining.
5. Since the $4^{th}$ entry block is free (location 3093) we will place the encrypted file there. Set the following attributes:
   a. Used (bit 7) to 1
   b. Continued (bit 6) to 0 (because this is the first entry block for the file.)
   c. Directory (bit 5) to 0.
   d. Read-only (bit 4) to 1 if MyPic.bmp is read-only.
   e. Compress (bit 1) to 0.
   f. Encrypt (bit 0) to 0.
Since this file will reside in the Test directory the location 2069 will be stored in the previous block field.
6. There will be continued blocks. Set the next block field to 0 (we will have to return here to set the location of the next block.)
7. The entry name size field will hold 9 ("MyPic.bmp" is 9 characters.)
8. The entry name field will hold "MyPic.bmp" (without the quotes.)

9. The entry size field will hold 1800 (the encrypted file is 1800 bytes.)
10. The file modification field will hold the modified date and time of MyPic.bmp.
11. The key field will contain the random number key.
12. The entry data field will contain the 973 bytes of the encrypted data file. There will be no unused bytes.
13. Find the next unused entry block. The 5$^{th}$ entry block is free (at location 4117.)
14. Place 4117 in the next entry field (of the 4$^{th}$ entry block.)
15. In the 5$^{th}$ entry block, set attributes to:
    a. Used (bit 7) to 1
    b. Continued (bit 6) to 0 (because this is not the first entry block for the file.)
    c. Directory (bit 5) to 0.
    d. Read-only (bit 4) to 1 if MyPic.bmp is read-only.
    e. Compress (bit 1) to 0.
    f. Encrypt (bit 0) to 0.
16. Set the previous block field to 3093 (the location of the 4$^{th}$ entry block.)
17. This 5$^{th}$ block should contain the rest of the file. Set the next block field to −1.
18. The EB-Name and EB-File-Info sections are not used with a continued block. This gives 1015 bytes available for file data.
19. 973 bytes of the file was already written in the 4$^{th}$ entry block. We have 827 bytes left.
20. The entry data field will contain 827 bytes of the encrypted data file. 188 bytes will be left over.
21. In the Test directory entry block (3$^{rd}$ block, location 2069), find a free directory entry.
22. The first directory entry is free. Set it to 3093 (the first entry block of the MyPic.bmp file.)
23. Add 1 to the directory entries.
24. In the EFS-Info section, subtract 2 from the free entries field (we used two entry blocks.)
25. Subtract 2048 from the free space field (2 entry blocks times 1024.)

| Location | Data | Description |
|---|---|---|
| 1 | 1024 | Entry block size. |
| 5 | 4882 | Number of entry blocks. |
| 9 | 812 | Unused space at end of EFS2 file. |
| 13 | 4881 | Number of free entry blocks. |
| 17 | 4994296 | Number of free bytes. |
| 21 | ... | 1$^{st}$ entry block (Root dir.) |
| 1045 | ... | 2$^{nd}$ entry block (Sample.txt) |
| 2069 | 10100000 | 3$^{rd}$ entry block. Test directory attributes. |
| 2070 | 21 | Parent directory (Root) |
| 2074 | −1 | No continued blocks. |
| 2078 | 4 | Name is 4 characters. |
| 2079 | Test | Name is "Test". |
| 2083 | 1 | There is one file/dir in this directory. |
| 2087 | 3093 | 1$^{st}$ directory entry (MyPic.bmp.) |
| 2091 | 0 | 2$^{nd}$ directory entry (empty.) |
| 2095 | ... | Directory entries 3 through 252 (empty.) |
| 3091 | | 1 byte of unused space. |
| 3092 | 10000000 | 4$^{th}$ entry block. MyPic.bmp attributes. |
| 3093 | 2069 | Location of containing directory (Test directory.) |
| 3097 | 4117 | The next block of this file. |
| 3101 | 9 | The file name is 9 characters long. |
| 3102 | MyPic.bmp | The file name. |
| 3111 | 1800 | The file is 30 bytes. |
| 3115 | 12:30 am Jan. 1, 2006 | The modified file date. |
| 3123 | 5598334 | The encryption key. |
| 3143 | bo sho~da ... fa-so.la ̂ * | 973 bytes of encrypted data. |
| 4116 | 11000000 | 5$^{th}$ entry block. Continued attributes. |
| 4117 | 3093 | Previous block. |
| 4121 | −1 | No more blocks. |
| 4125 | shim**my ... coco%bop | 827 bytes of encrypted data. |
| 4952 | | 188 bytes of unused space. |
| 5140 | ... | 6$^{th}$ entry block (unused.) |

Deleting a File

To delete a file change the attribute fields for each entry block for the file to unused. Then remove the file from its parent directory. In this example the MyPic.bmp file will be deleted.

1. In the 4$^{th}$ entry block (location 3092) set the attribute to unused.
2. In the 5$^{th}$ entry block (location 4116) set the attribute to unused.
3. In the Test directory (location 2069) subtract 1 from number of files/dirs.
4. Clear the directory entry (location 2087.)
5. In the EFS-Info section, add the number of blocks that were freed back to the free entries field.
6. Add the number of bytes that were freed back to the free space field.

| Location | Data | Description |
|---|---|---|
| 1 | 1024 | Entry block size. |
| 5 | 4882 | Number of entry blocks. |
| 9 | 812 | Unused space at end of EFS2 file. |
| 13 | 4879 | Number of free entry blocks. |
| 17 | 4996344 | Number of free bytes. |
| 21 | ... | 1$^{st}$ entry block (Root dir.) |
| 1045 | ... | 2$^{nd}$ entry block (Sample.txt) |
| 2069 | 10100000 | 3$^{rd}$ entry block. Test directory attributes. |
| 2070 | 21 | Parent directory (Root) |
| 2074 | −1 | No continued blocks. |
| 2078 | 4 | Name is 4 characters. |
| 2079 | Test | Name is "Test". |
| 2083 | 1 | There is one file/dir in this directory. |
| 2087 | 0 | 1$^{st}$ directory entry (now empty.) |
| 2091 | 0 | 2$^{nd}$ directory entry (empty.) |
| 2095 | ... | Directory entries 3 through 252 (empty.) |
| 3091 | | 1 byte of unused space. |
| 3092 | 00000000 | 4$^{th}$ entry block (unused.) |
| 3093 | 2069 | Location of containing directory (Test directory.) |
| 3097 | 4117 | The next block of this file. |
| 3101 | 9 | The file name is 9 characters long. |
| 3102 | MyPic.bmp | The file name. |
| 3111 | 1800 | The file is 30 bytes. |
| 3115 | 12:30 am Jan. 1, 2006 | The modified file date. |
| 3123 | 5598334 | The encryption key. |
| 3143 | bo sho~da ... fa-so.la ̂ * | 973 bytes of encrypted data. |
| 4116 | 01000000 | 5$^{th}$ entry block (unused.) |
| 4117 | 3093 | Previous block. |
| 4121 | −1 | No more blocks. |
| 4125 | shim**my ... coco%bop | 827 bytes of encrypted data. |
| 4952 | | 188 bytes of unused space. |
| 5140 | ... | 6$^{th}$ entry block (unused.) |

Deleting a Directory

A directory must be cleared of files before it can be deleted. To delete the directory set the directory's entry blocks to unused, remove the entry from the parent directory, and return the entry blocks and bytes back to the EFS-Info section. The Root directory cannot be deleted. In this example the Test directory is deleted.

1. The Test directory is located at 2069. There is only one entry block. Set the entry block's attributes to unused.
2. In the Root directory, the $2^{nd}$ directory entry contains the location of the Test directory. Set it to 0.
3. Add 1 to the free entries field in the EFS-Info section.
4. Add 1024 to the free bytes field.

| Location | Data | Description |
|---|---|---|
| 1 | 1024 | Entry block size. |
| 5 | 4882 | Number of entry blocks. |
| 9 | 812 | Unused space at end of EFS2 file. |
| 13 | 4880 | Number of free entry blocks. |
| 17 | 4997368 | Number of free bytes. |
| 21 | 10100000 | $1^{st}$ entry block (root directory) attributes. |
| 22 | −1 | This is the root directory (no containing dir.) |
| 26 | −1 | No continued blocks. |
| 30 | 1 | Directory name is 1 character. |
| 31 | \ | Directory name. |
| 32 | 2 | Number of files/directories in this directory. |
| 36 | 1045 | $1^{st}$ directory entry (file Sample.txt.) |
| 40 | 0 | $2^{nd}$ directory entry (empty.) |
| 44 | 0 | $3^{rd}$ directory entry (empty.) |
| 48 | . . . | Directory entries 4 through 252 (empty.) |
| 1044 | | 1 byte of unused space. |
| 1045 | . . . | $2^{nd}$ entry block (Sample.txt.) |
| 2069 | 00100000 | $3^{rd}$ entry block (unused.) |
| 2070 | 21 | Parent directory (Root) |
| 2074 | −1 | No continued blocks. |
| 2078 | 4 | Name is 4 characters. |
| 2079 | Test | Name is "Test". |
| 2083 | 1 | There is one file/dir in this directory. |
| 2087 | 0 | $1^{st}$ directory entry (now empty.) |
| 2091 | 0 | $2^{nd}$ directory entry (empty.) |
| 2095 | . . . | Directory entries 3 through 252 (empty.) |
| 3091 | | 1 byte of unused space. |

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the embodiments shown describe a user interacting with a security interface to instruct a removable drive manager to encrypt and decrypt files, but other embodiments of the invention involve the removable drive manager automatically encrypting data that is stored to a removable drive and/or automatically decrypting data that is removed from the drives, with both actions occurring after verification of a password.

In one exemplary embodiment, a Universal Serial Bus (USB) removable device is provided, for connection to a USB port of a computer, and the USB removable device includes a computer readable medium. The computer readable medium includes: computer readable program code devices configured to cause the computer to effect displaying of a user interface on a monitor of the computer prompting a user for inputting a password, a selection of a data file on the computer, and a request for secure storage of the data file on the USB removable device; computer readable program code devices configured to cause the computer to effect generating of an encrypt/decrypt key from the password; computer readable program code devices configured to cause the computer to effect encrypting the selected data file using the encrypt/decrypt key; and computer readable program code devices configured to cause the computer to effect storing of the encrypted data file on the USB removable device. Typically, in this manner, additional computer readable program code devices are not provided on the computer to support operation of the computer readable program code devices effecting the encrypting of the selected data file.

In the USB removable device, the user interface is configured to allow a user to define a folder for storing the selected data file on the USB removable device and to perform the selection of the data file by moving an identifier for the data file to the defined folder. Also, in the USB removable device, the computer readable program devices are configured to cause the computer to effect encrypting comprises an Advanced Encryption Standard (AES) algorithm. Further, the USB removable device may include computer readable program devices configured to cause the computer to effect verifying the input password including comparing the password with a stored key on the USB removable device. Still further, in the USB removable device, the computer device may include an operating system adapted for supporting USB and the user may be prompted via the user interface for creation of a secure folder and selection of additional data files for inclusion in the secure folder. In such cases, the computer readable program devices may be configured to cause the computer to effect encrypting to encrypt all the additional data files in the secure folder as a single merged file or as separate files using the encrypt/decrypt file. The device may also include computer readable program devices for causing the computer to effect decrypting the stored encrypted data file using the encrypt/decrypt key upon receiving an unlock request and verifying a password using the encrypt/decrypt key.

The removable drive manager described above is useful for providing a removable drive (or GoGo Key or GGK) that effectively encrypts and decrypts data when inserted into nearly any computing device and without leaving a footprint on the computing device after the removable drive is removed. The following provides a number of modifications or advances that can be used to improve or build upon this good foundation.

The removable drive manager as described above typically stores all of its files in a single, encrypted file. The entire file is decrypted and all files extracted before the user accesses any of the files. In other versions, though, the removable drive manager may also store all of its files in a single file, but the manager may act to encrypt each file individually. This allows the user to add, change, and remove files from the block file without encrypting/decrypting the entire block file. In other cases, the encrypt/decrypt functions may be performed on a folder-by-folder basis rather than having to perform these functions on the single block file of all data stored on the removable drive.

This provides a significant increase in the speed of data access on the removable drive. Since the removable drive manager can access each file individually without having to encrypt/decrypt all the files, the user will notice a drastic increase in speed. For example, without this individual file function, a user would use the removable drive manager to store 50 files on a key or removable drive. To edit one of the files, the user would unlock the key, which means that all 50 files would be decrypted by the removable drive manager. The user then edits the desired file and locks the key again. The 50 files are then encrypted back onto the key by the removable drive manager. Using this same example with a removable drive manager configured to work on the files on a file-by-file basis means that when the user accesses the desired file it is decrypted automatically. The user makes the changes and saves the file. The file is then encrypted back onto the key by the removable drive manager. The other 49 files are not touched by the removable drive manager.

In some embodiments, it may be useful for the user to be able to customize the user interface (e.g., interface 116 in system 100 of FIG. 1). As discussed above, the removable drive manager may be adapted to provide different interfaces or "skins." These skins often were built into the program providing the removable drive manager. To add a new skin, the entire program was recompiled. In contrast, other embodiments of the removable drive manager may also have or provide skins, but these skins are provided in a manner to be external to the program. As a result, adding or modifying a skin is very easy and can be done by the users themselves.

Another feature that may be provided by the removable drive manager is to allow the user to use/input a picture (digital file of a photograph) instead of a password. In these embodiments, the user of removable drive inserts it into a computer and starts the removable drive manager. The user is then prompted to enter a password or to use a photograph (e.g., a JPEG file or other digital image file) as the "password" or key. In some cases, the user is asked to select a picture and that to also select/choose (e.g., with a touchscreen, touchpad, mouse, or other input device) at least four points on that picture. These points are combined to create the user's password. This new feature may be called "PassPic." The user may select a favorite picture or image, and then choose multiple touch points to create a picture/password for accessing the encrypted data files stored on their key/removable drive. Picture/passwords are easier for some people to remember than passwords and can even increase the access security to these data files relative to use of a password (as many user's may choose and reuse a guessable word such as the name of their child, spouse, or pet).

Another variation on the way the removable drive manager operates is how it protects files and folders. The removable drive manager may be configured to have the ability to password-protect each individual file or folder within the encrypted USB key. This adds a higher level of security unknown to any security software previously available.

The removable drive manager is a software program that is typically installed on a USB key (SD cards or like media can be substituted) providing robust security for a user's digital data (i.e., files) such as by using the AES (Advanced Encryption Standard) 256 bit encryption system. This means that the files are protected by one of the very best encryption programs, approved and used by the United States government. The removable drive manager may be adapted to generate a user-friendly interface (e.g., interface 116 in FIG. 1) allowing even computer novices to use the key and its removable drive manager with very little instruction.

The software used to implement the removable drive manager or GGK is easy to use. The user simply has to insert the key containing the software into any computer that has a USB port and that uses Windows XP or higher or other compatible OS. The user then may double-click on the GOGO Key or similar icon, and the removable drive manager functions to generate a splash screen that appears on the computer/device monitor screen displaying the GGK logo. This opening screen or window can be changed to a company logo, a scanned business card, or a favorite picture by the user after they select and input their password. The user may then drag and drop whatever files they choose into or out of the removable drive via the removable drive manager (the software on the key). When the user is done, they can press a lock button.

In many applications, the user can and should do all of their work on the key, including document changes and/or printing from the key/removable drive. This helps to greatly minimize the security risk to their files. The user may then remove the key and proceed to any other computer and access their secure files with this other computer using the removable drive manager. The small size of the key makes it easily portable for the transportation of files between home and office or for anyone traveling abroad, but the high security of the encryption software ensures that the loss of the key will not allow a finder of the key to access sensitive data stored in an encrypted manner in the key's memory.

Significantly, with use of the inventors' removable drive manager and a key/drive containing this program, there is no footprint left behind on the hard drive of the computer. In contrast, the inventors' research indicates that conventional encryption programs installed on USB keys require that additional software be installed on each and every computer with which the key is to be interfaced, before the key's encryption software can be utilized. The presence of this additional data on the computer leaves a telltale footprint on every hard drive. This compromises the security of these computers, making them vulnerable to unauthorized users or hackers. The removable drive manager solves this problem by performing all functions on the key or removable drive itself, without the installation of any additional software on the computer in which the key/drive is inserted.

The improved speeds with these more recent versions of the removable drive manager were tested with a variety USB keys to determine 128-bit speeds. The testing was done on a readily available computer (e.g., one with 3 GHz X 4 Core, 8 GB RAM, Windows 8 64-bit). The test data used was 35 MB of documents, pictures, and music. As shown in the following table, the Lexar key outperformed all other USB 2.0 keys and was nearly as good in performance as the USB 3.0 key with the removable drive manager (e.g., GGK V2 or version two).

|  | USB 3.0 | SB Red Key | KingMax | Lexar | HP |
| --- | --- | --- | --- | --- | --- |
| KeyMaker | 3 sec | 10 sec | 17 sec | 4 sec | 8 sec |
| Copy Data (52 MB) | 8 sec | 20 sec | 21 sec | 8 sec | 25 sec |
| Delete Data | <1 sec | 1 sec | 1 sec | <1 sec | 1 sec |

The inventors also performed testing of the second version of the removable drive manager (with the above added features). The removable drive manager was tested with a variety USB keys to determine 256-bit speeds for comparison versus 128-bit speeds. Again, the testing was done on a readily available computer (e.g., one with 3 GHz X 4 Core, 8 GB RAM, Windows 8 64-bit), and the test data used was 35 MB of documents, pictures, and music. The following table shows the results of this testing that show the efficiency and speed of the described removable drive manager and its use on removable drives such as USB keys.

| Operation | 128 Bit | 256 Bit |
| --- | --- | --- |
| Create Key | <1 sec | <1 sec |
| Add Data | 10 sec | 8 Sec |
| Close Key | 1 sec | <1 sec |
| Open Key | 1 sec | <1 sec |
| Delete Data | 2 sec | 1 sec |
| Close Key | 1 sec | 1 sec |
| Open Key | 1 sec | <1 sec |

FIGS. 20-25 illustrate processes that may be carried out by a removable drive manager of the present description to facilitate use of a picture or image file (e.g., a JPEG or similar file) as a password in the place of an text or alphanumeric password for accessing data on their removable drive or for encrypting/decrypting a particular file (e.g., a differing image may be used as a "password" for each file or for a folder or for a group of files/folders).

FIG. 20 illustrates a process 2000 for loading a picture or image file as a password for use by a removable drive manager. As shown, a password picture load event is detected at 2010 such as by a user selecting an icon offered in a GUI (e.g., interface 116 of FIG. 1) to choose a picture/image password. At 2014, a name of the password image file is received by the removable drive manager, and this may be a choice of a default image or may be a user-provided image file. Hence, at 2016, the removable drive manager determines whether the name matches a default password image. If not, the image provided by the user is identified for use as the password image at 2020, but, if yes at 2016, the manager acts identifies the image for use by the user as a password as one of a set of available default password images at 2024.

At 2028, the removable drive manager functions to draw a grid for the image identified at 2020 or 2024, and the control of the processing is returned at 2030 to the main removable drive manager process. FIG. 21 shows steps involved in drawing a grid for use in processing user input to use the image as a verifiable password, and the process 2028 involves setting a useful height and width for the image grid.

Figure 25:
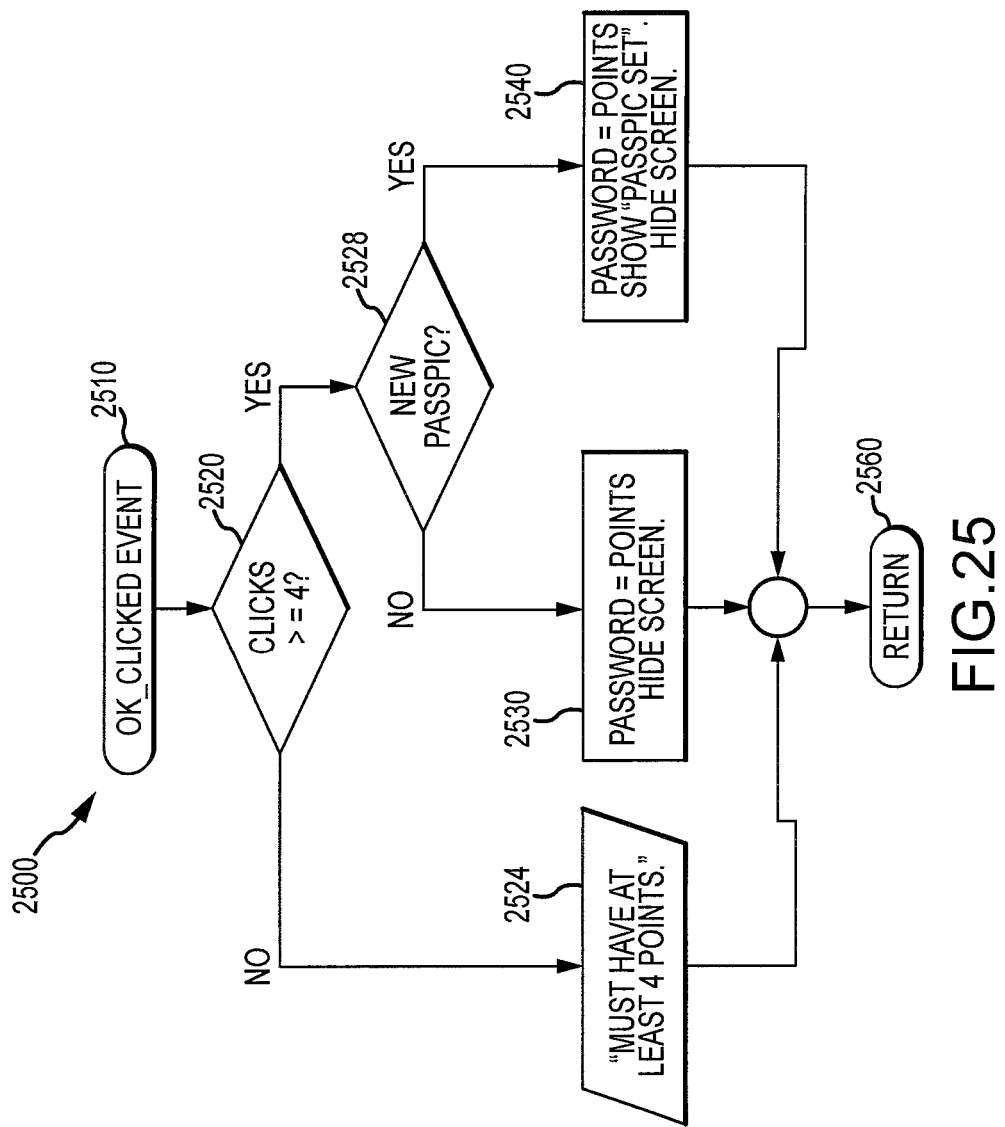

FIG. 25 provides a process 2500 for generating an image-based password for the user. At 2510, the removable drive manager recognizes an event indicating that the user has indicated the desire to use a particular image to provide a password for accessing data (e.g., a particular file). For example, the user may select an OK button in an interface associated with defining an image-based password using an image. At step 2520, the process 2500 involves determining whether the user has input a predefined number of points (X-Y coordinates on the image) on the image for use in the password definition. This may involve moving the cursor (such as with a touchscreen, a touchpad, or a mouse) to differing locations (e.g., 3 to 5 locations with 4 image location selections shown in process 2500 of FIG. 25) on the image and then selecting the location such as with a left button activation or "click."

If the number of selections is less than required by the manager, the method 2500 includes at 2524 prompting the user via the interface to enter additional points on the image (e.g., an image displayed on a monitor as part of the removable drive manager-generated GUI). If an adequate number of points on the image are determined to be selected at 2520, the method 2500 continues at 2528 with a determination of whether or not the image associated with the set of selected points/coordinates on the image is a new password image/picture. If not, the image-based password is set to be the set of selected points/coordinates on the image and the screen is hidden. If yes, the image-based password is set to be the set of selected points, and the user interface is updated to show that the password has been set then the screen is hidden. Then, the control is returned at 2560 to the removable drive manager or calling program.

FIG. 22 illustrates the process 2200 of converting user input on a screen showing the selected password image into user input (e.g., for establishing or entering the password to access the removable drive manager and/or to encrypt/decrypt files). At 2210, the method 2200 involves the removable drive manager receiving or identifying a user selection at a point/coordinate within a displayed password image such as by detecting a mouse click event when the mouse is moved to place a cursor within the displayed image. When detection occurs at 2210, the method 2200 continues at 2220 with determining whether the event was a true selection input such as by determining whether the mouse click was a left or right button selection.

If the user input is not a selection (e.g., not a left click of a mouse), the method 2200 may return control at 2240 to the calling program. If a proper selection is made (e.g., with a right mouse click), the method 2200 continues at 2230 with a conversion of the location of the input (e.g., location of a cursor or location of a user's finger on a touchscreen) to X-Y coordinates. This may be performed as shown in FIG. 23 in more detail. Then, the method 2200 continues at 2240 with a conversion of the coordinates to positions/locations on the previously drawn grid (in method 2028 shown in FIG. 21), and this conversion is shown in more detail in FIG. 24. Then, the method 2200 continues at 2244 with saving the user-entered points in memory and with showing the user-entered points within the displayed image in the user interface. Control is then returned at 2240 to the calling program/routine.

Figure 26:
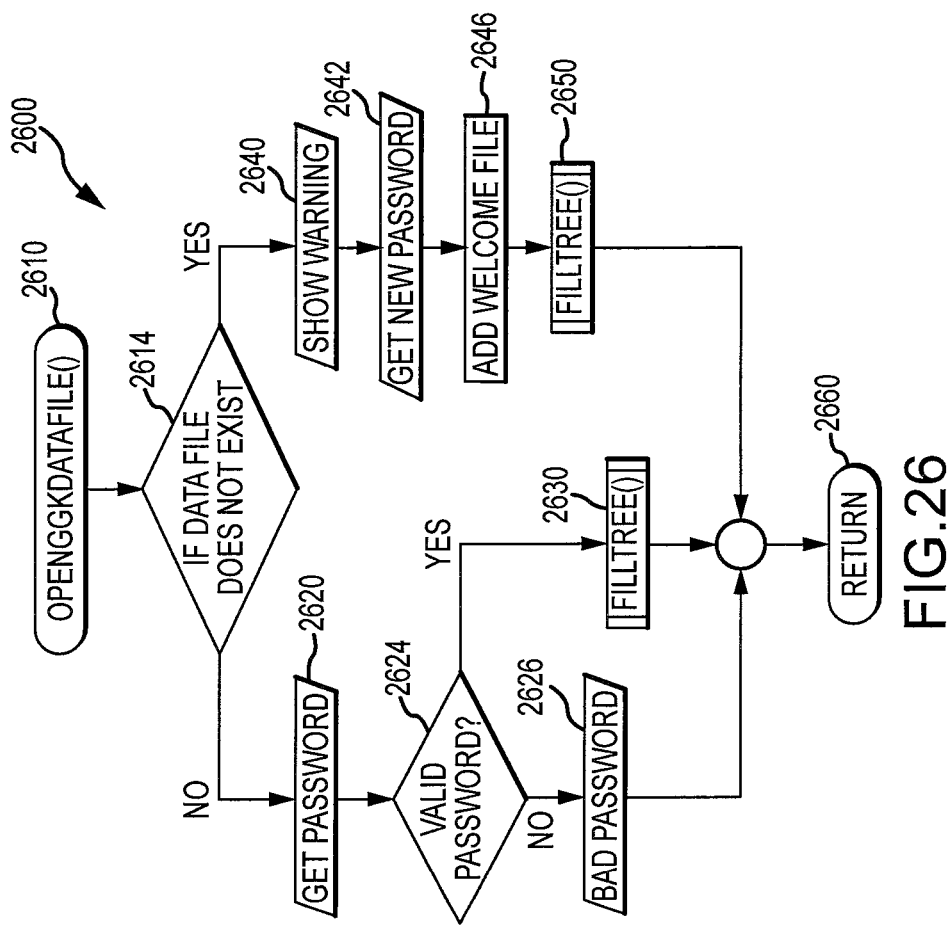

As discussed above, the removable drive manager may be configured to allow a user to work on a file-by-file basis, and it may be useful to provide more detail on exemplary processes that may be used to implement this feature. FIG. 26 illustrates a method 2600 performed by the removable drive manager to process individual user files. The method 2600 starts upon a user requesting that a file be opened via a user interface or the like. At 2614, the method 2600 involves determining whether or not the data file already exists. If it exists, the method 2600 continues at 2620 with obtaining the password from the user such as a set of points in a selected and displayed password image.

At 2624, the method 2600 continues with a determination of whether or not the password is valid (e.g., do the set of points selected by a user on a displayed image match those previously entered or selected?). If not valid, the password is identified as bad at 2626 and the user may be given notice of the failed access, and control is returned at 2660. If the password is determined to be valid, the method 2600 continues at 2630 with filling of a tree, and this process 2630 (and 2650) is shown in more detail in FIG. 27. The tree filling process 2630 (and 2650) includes the step of getting a folder 2635, which is shown in more detail in FIG. 28. For each folder, the method 2635 includes getting the files in that folder at step 2900.

Figure 29:
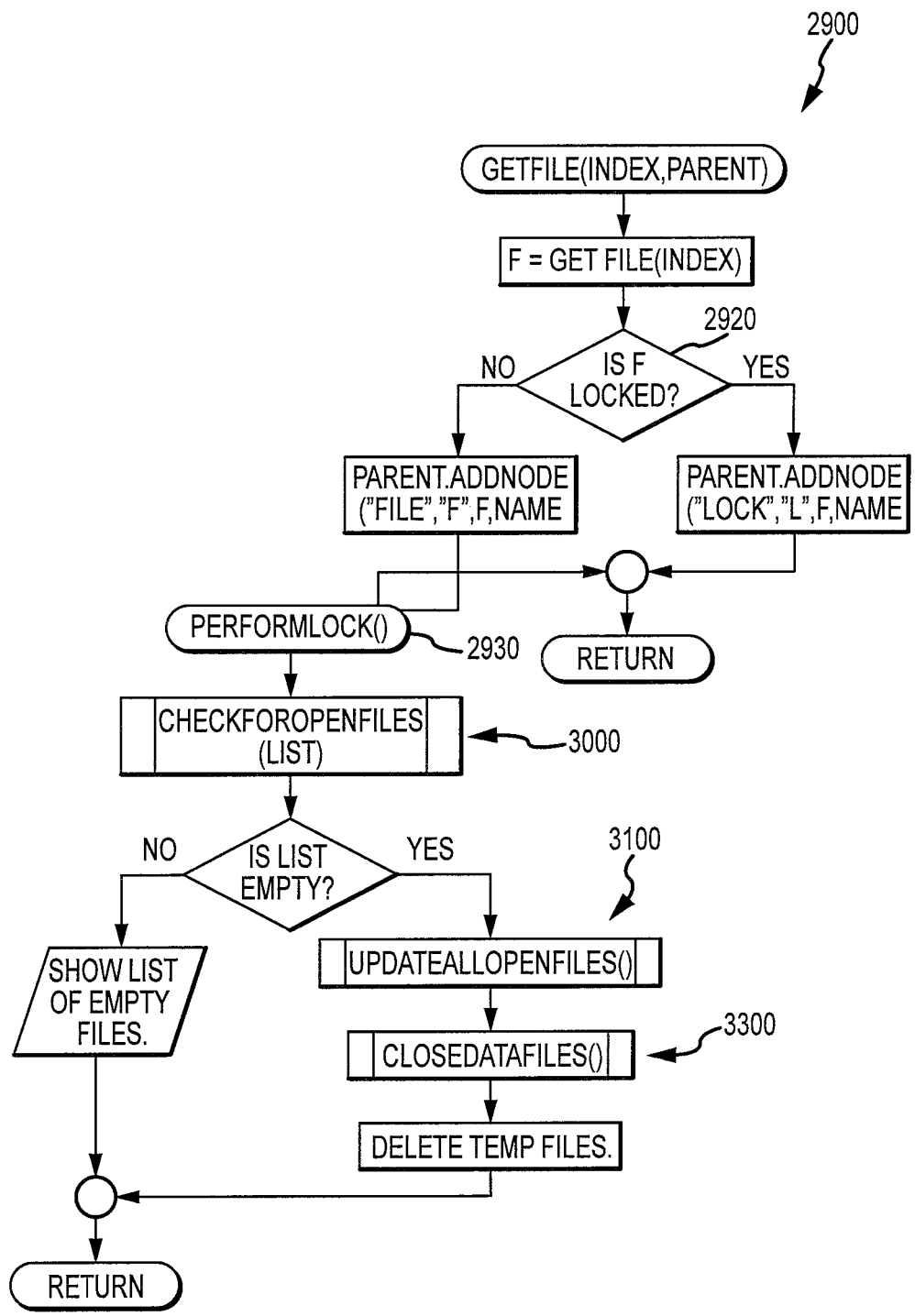
Figure 31:
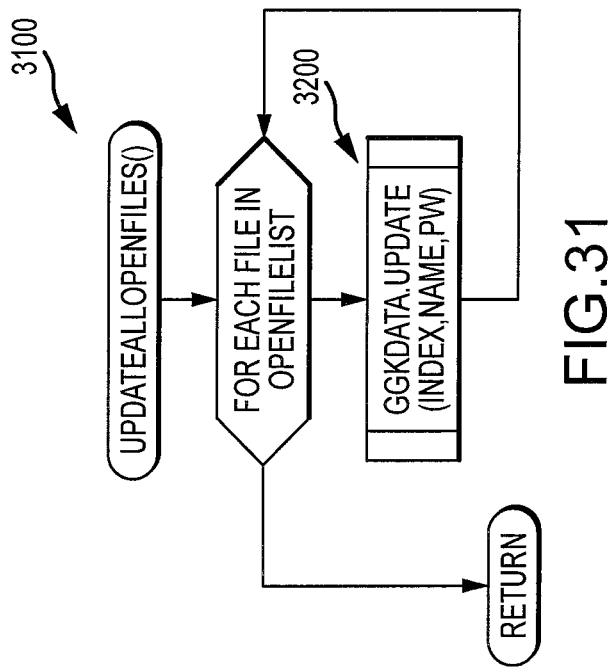
Figure 30:
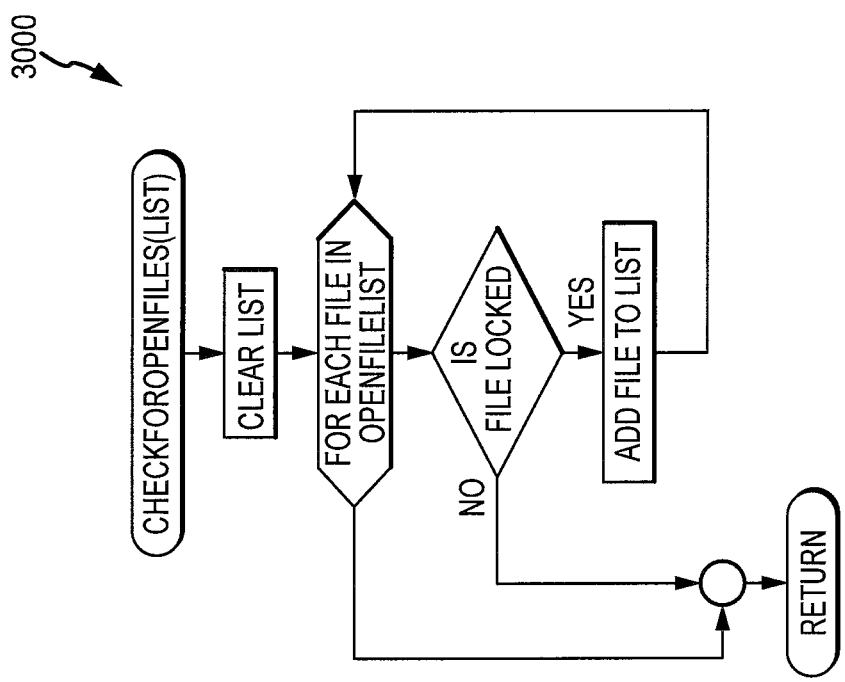
Figure 33:
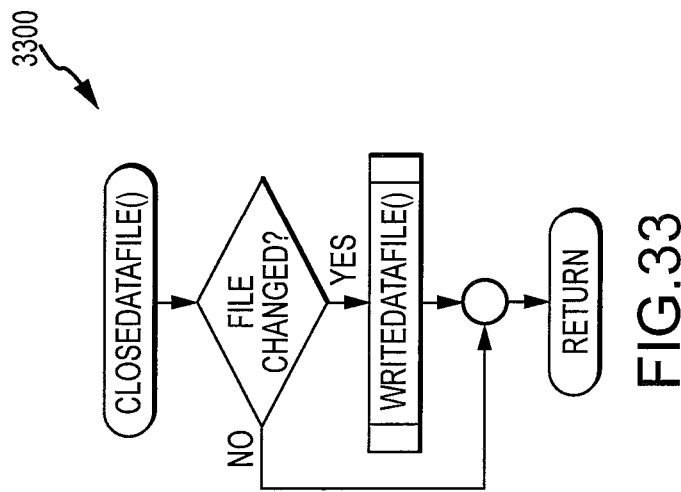
Figure 32:
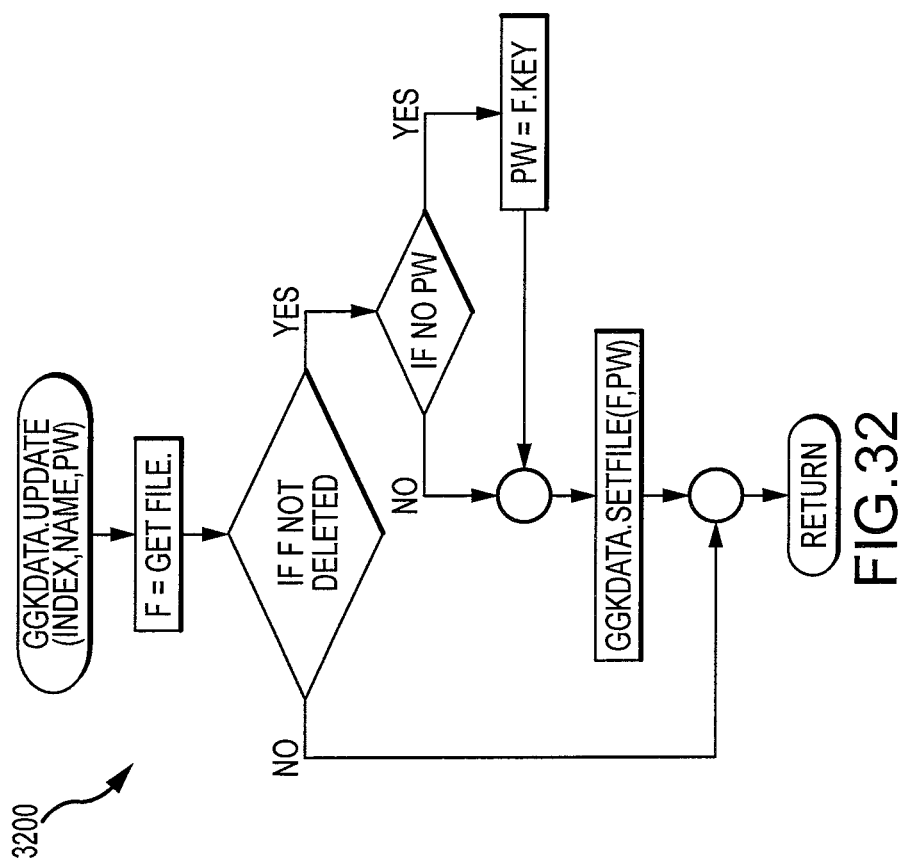

The process of getting files 2900 is explained in more detail with the flow diagram shown in FIG. 29, and this method 2900 includes determining at 2920 whether the file is locked and if not performing locks, e.g., at 2930. The method 2900 also includes checking for open files at 3000, which is shown and explained in more detail in FIG. 30. The method 2900 also includes the step of updating open files as shown in FIG. 31 (which, in turn, includes the step of updating removable drive manager data 3200 as shown in FIG. 32) and closing data files as shown in FIG. 33.

Figure 27:
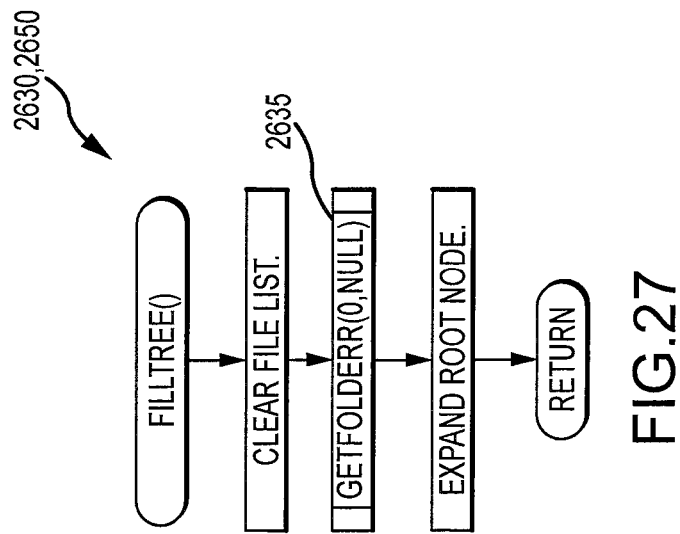
FIGS. 26-33 are flow diagrams showing processes implemented by a removable drive manager, in part, to process (e.g., encrypt and decrypt) user's data on a file-by-file basis.
Figure 28:
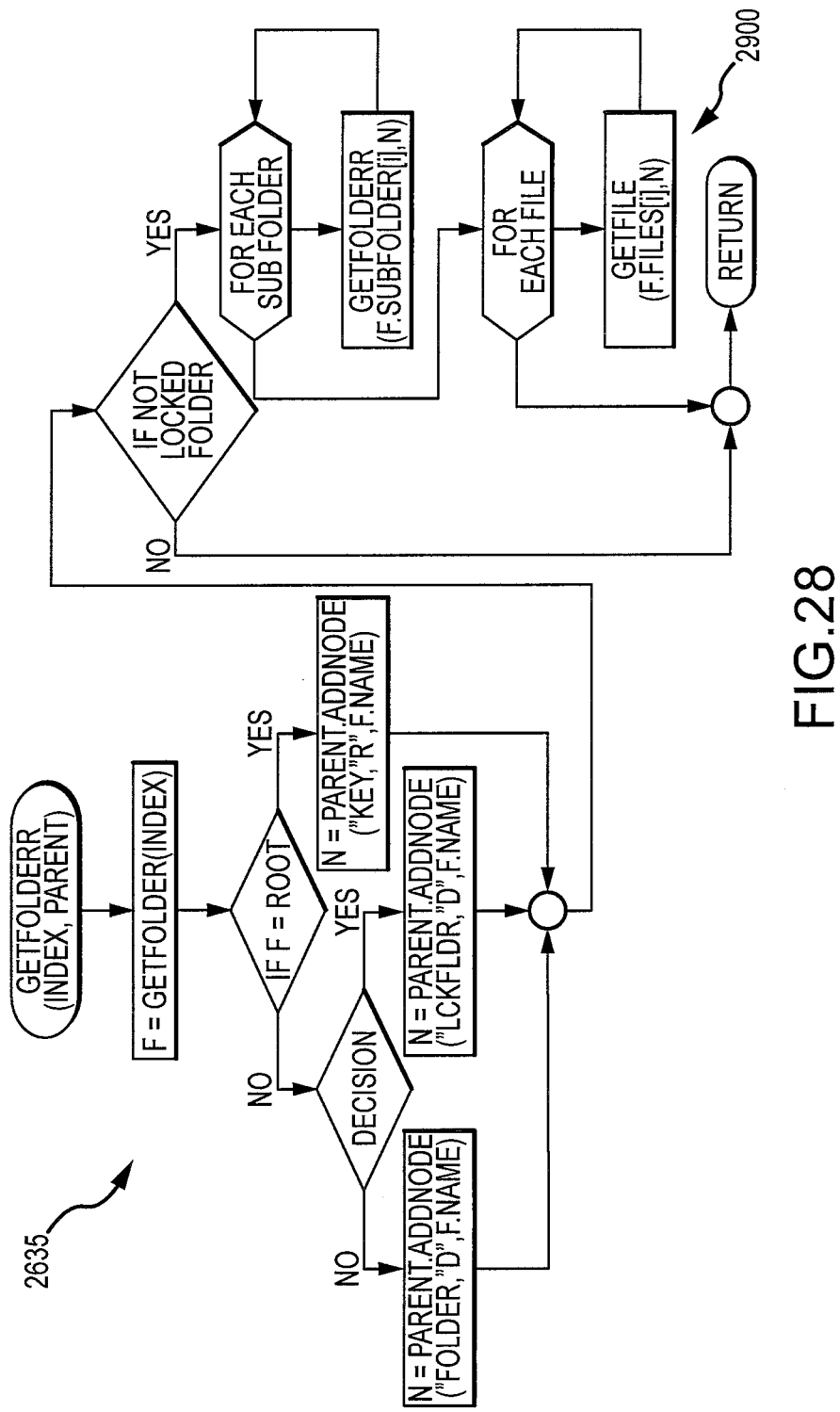

Returning to FIG. 26 and the method 2600, when the data file does not exist, the method 2600 continues at 2640 with showing the user a warning. Then, the method 2600 continues with getting a new password at 2642 and adding a welcome file at 2646. The method 2600 then continues at 2650 with filing the tree as shown in FIG. 27 and as discussed above. The control is then returned to the calling program at 2660.

We claim:

1. A removable drive for connecting to computer devices and securely storing digital data, comprising:
    memory providing data storage on the removable drive; and
    a removable drive manager adapted for being run by an operating system of the computer device to receive a password, to generate a key based on the password, to encrypt using the key a data file accessible in memory of the computer device, and to store the encrypted file in the memory of the removable drive, wherein the password comprises a set of at least three points within an image displayed, by the removable drive manager, in a monitor screen of the computer device.

2. The removable drive of claim 1, wherein the password is received as a set of mouse click events and wherein the removable drive manager converts the mouse click events into coordinates.

3. The removable drive of claim 2, wherein the removable drive manager validates the received password by comparing the coordinates with coordinates on a grid generated based on the displayed image.

4. The removable drive of claim 1, wherein the removable drive manager is operable to perform the encryption of the data file without corresponding encryption applications being loaded on computer system prior to the connector being connected to the port, whereby the memory of the computer device is free of a footprint of encrypting using the key from the data file.

5. The removable drive of claim 1, wherein the port comprises a Universal Serial Bus (USB) port and wherein the operating system comprises a USB driver.

6. The removable drive of claim 1, wherein the removable drive manager comprises a cryptography algorithm comprising an Advanced Encryption Standard (AES) algorithm for encrypting and decrypting using the password-based key.

7. The removable drive of claim 1, wherein the removable drive manager operates to encrypt an additional data file with the data file including combining the data file with the additional data file and encrypting the combined data file and additional data file to form a single encrypted file for storage on in the memory of the removable drive.

8. A Universal Serial Bus (USB) removable device for connection to a USB port of a computer with a non-transitory computer readable medium, the non-transitory computer readable medium comprising:
computer readable program code devices causing the computer to display a user interface on a monitor of the computer prompting a user for inputting a password, a selection of plurality of data files on the computer, and a request for secure storage of the data files on the USB removable device;
computer readable program code devices causing the computer to generate a encrypt/decrypt key from the password;
computer readable program code devices causing the computer to encrypt the selected data file using the encrypt/decrypt key;
computer readable program code devices configured to cause the computer to effect storing of the encrypted data file on the USB removable device; and
computer readable program code devices configured to cause the computer to receive user input selecting one of the stored and encrypted files for decryption and, in response, decrypting the selected one using the encrypt/decrypt key.

9. The USB removable device of claim 8, wherein additional computer readable program code devices are not provided on the computer to support operation of the computer readable program code devices during the encrypting of the selected data file.

10. The USB removable device of claim 8, further comprising computer readable program devices causing the computer to verify the input password including comparing the password with a stored key on the USB removable device, wherein memory of the computer device is free of a footprint of the encrypting of the selected data file.

11. The USB removable device of claim 8, wherein the computer readable program devices causing the computer to encrypt comprises an Advanced Encryption Standard (AES) algorithm.

12. The USB removable device of claim 8, wherein the computer device comprises an operating system adapted for supporting USB.

13. The USB removable device of claim 8, wherein the inputting of the password comprises selecting an image file for display in the user interface and receiving from a user input device a selection of a number of points in an image displayed in the user interface based on the image file.

14. The USB removable device of claim 8, wherein the password is verified by comparing the selected number of points with a set of stored coordinates for a grid generated based on the image file.

15. A USB removable drive, comprising:
memory storing a plurality of encrypted private files stored as a block file;
a key generator operable by an operating system of a computer system linked to the USB removable drive to generate a key based on a set of user input; and
a cryptography algorithm operable by the operating system to encrypt a user-selected file for retrieval from the encrypted private files and decryption using the generated key without decryption of the block file,
wherein the cryptography algorithm is operable to perform the encryption of the selected one or more files without corresponding encryption applications being loaded on the computer system prior to the USB removable drive being connected to the port.

16. The drive of claim 15, wherein the user input comprises an image and a set of at least four points on the image.

17. The drive of claim 15, wherein the set of user input comprises a set of points identified by a location of a user input device relative to a displayed image on a computer device monitor.

18. The drive of claim 17, further comprising a user interface generator operable by the operating system of the computer system to generate a user interface including the displayed image and to receive the user input.

19. The drive of claim 15, wherein memory of the computer system is free of a footprint of the encryption using the generated key.

20. The drive of claim 15, wherein the cryptography algorithm is a standalone application that is able to perform AES-based encryption and decryption.

* * * * *